United States Patent [19]

Hideg et al.

[11] 4,108,136
[45] Aug. 22, 1978

[54] INTERNAL COMBUSTION ENGINE CONTROL SYSTEM

[75] Inventors: Laszlo Hideg, Dearborn; Robert P. Ernest, Dearborn Heights, both of Mich.

[73] Assignee: Ford Motor Company, Dearborn, Mich.

[21] Appl. No.: 691,050

[22] Filed: May 26, 1976

Related U.S. Application Data

[62] Division of Ser. No. 636,184, Nov. 28, 1975, Pat. No. 4,060,058.

[51] Int. Cl.$^2$ ............................................. F02B 53/10
[52] U.S. Cl. ................................. 123/209; 123/32 SP
[58] Field of Search ................... 123/8.09, 8.11, 8.13, 123/32 SP, 32 ST, 191 S, 191 SP

[56] References Cited

U.S. PATENT DOCUMENTS

| | | | |
|---|---|---|---|
| 3,270,722 | 9/1966 | Bernard | 123/32 ST |
| 3,508,530 | 4/1970 | Clawson | 123/8.09 X |
| 3,890,942 | 6/1975 | Date et al. | 123/32 SP X |
| 3,963,003 | 6/1976 | Downs | 123/32 ST X |
| 3,970,053 | 7/1976 | Goodacre | 123/32 SP X |
| 3,970,054 | 7/1976 | Henault et al. | 123/32 SP X |
| 3,995,604 | 12/1976 | Brandstetter | 123/32 ST X |
| 4,005,684 | 2/1977 | Habu | 123/32 SP X |
| 4,038,952 | 8/1977 | Nagano | 123/32 SP X |

*Primary Examiner*—Carlton R. Croyle
*Assistant Examiner*—Michael Koczo, Jr.
*Attorney, Agent, or Firm*—Joseph W. Malleck; Olin B. Johnson

[57] ABSTRACT

An apparatus and method for improving the combustion process of an internal combustion engine is disclosed. A prechamber containing a combustible mixture is designed to generate a torch eminating therefrom upon ignition; the torch is controlled to extend and penetrate deeply into the main combustion at a predetermined orientation without contact with the chamber walls. The swirling flame front of the sustained torch produces superior mixing with the unburned combustible mixture in the main combustion, particularly of a rotary engine. The prechamber is located outside the epitrochoid chamber of the rotary engine; in a nonstratified charge mode of this invention, the prechamber serves to receive a portion of the main chamber inducted charge during the compression cycle, which may lean and difficult to ignite in the main chamber. In the prechamber, concentrated hot walls and a localized spark facilitate ready ignition, which in turn permits generation of a torch therefrom.

A scavenging system and method is disclosed which serves to drive residual gas elements from the prechamber after the completion of each combustion cycle; the scavenging apparatus may be operated with an independent gas supply, a supply derived from the carburetor or intake of the engine, or from the inducted mixture within the main chamber. The scavenging system may have fuel enrichment to create a predetermined charge stratification.

A fuel injection system and method is disclosed which serves to augment or act as the sole prechamber charge.

Prechamber design, chamber shape, compression ratios and engine controls are arranged to reduce combustion heat losses and selected emission constituents.

5 Claims, 28 Drawing Figures

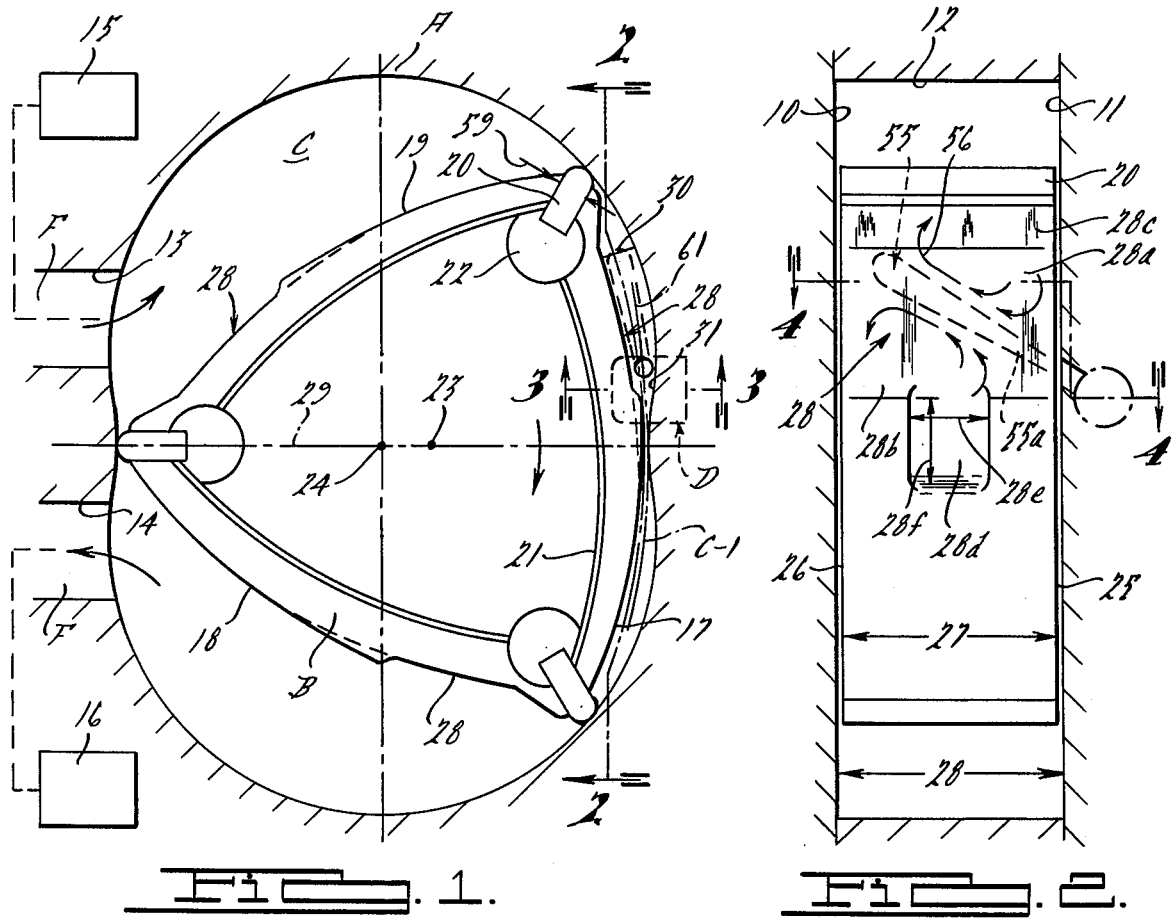
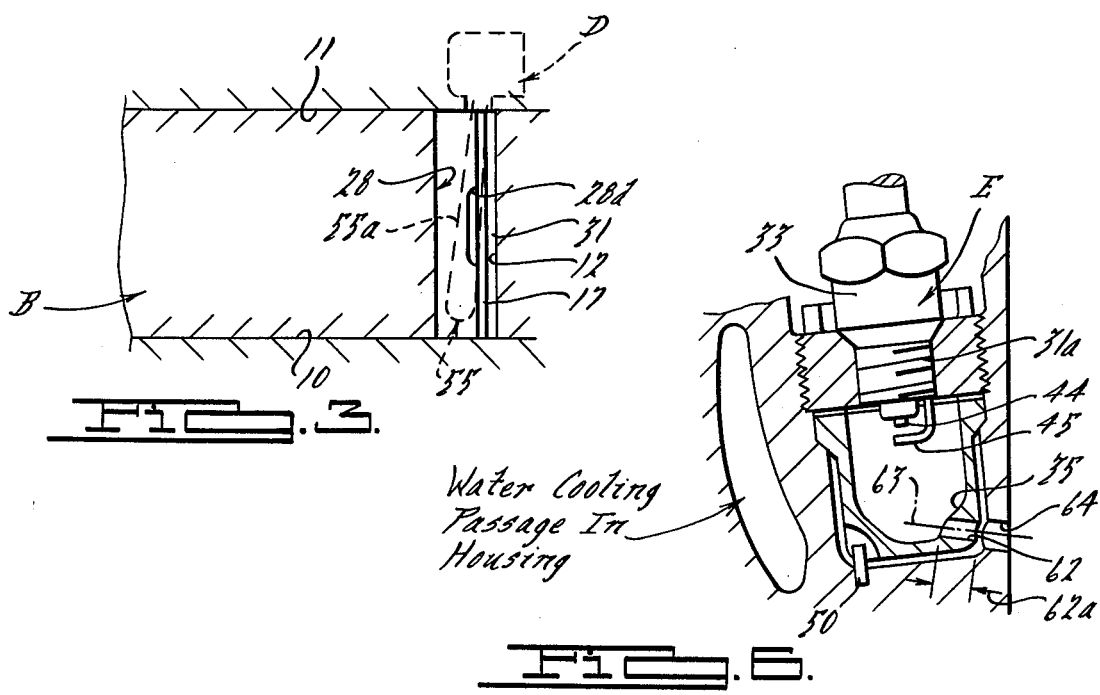

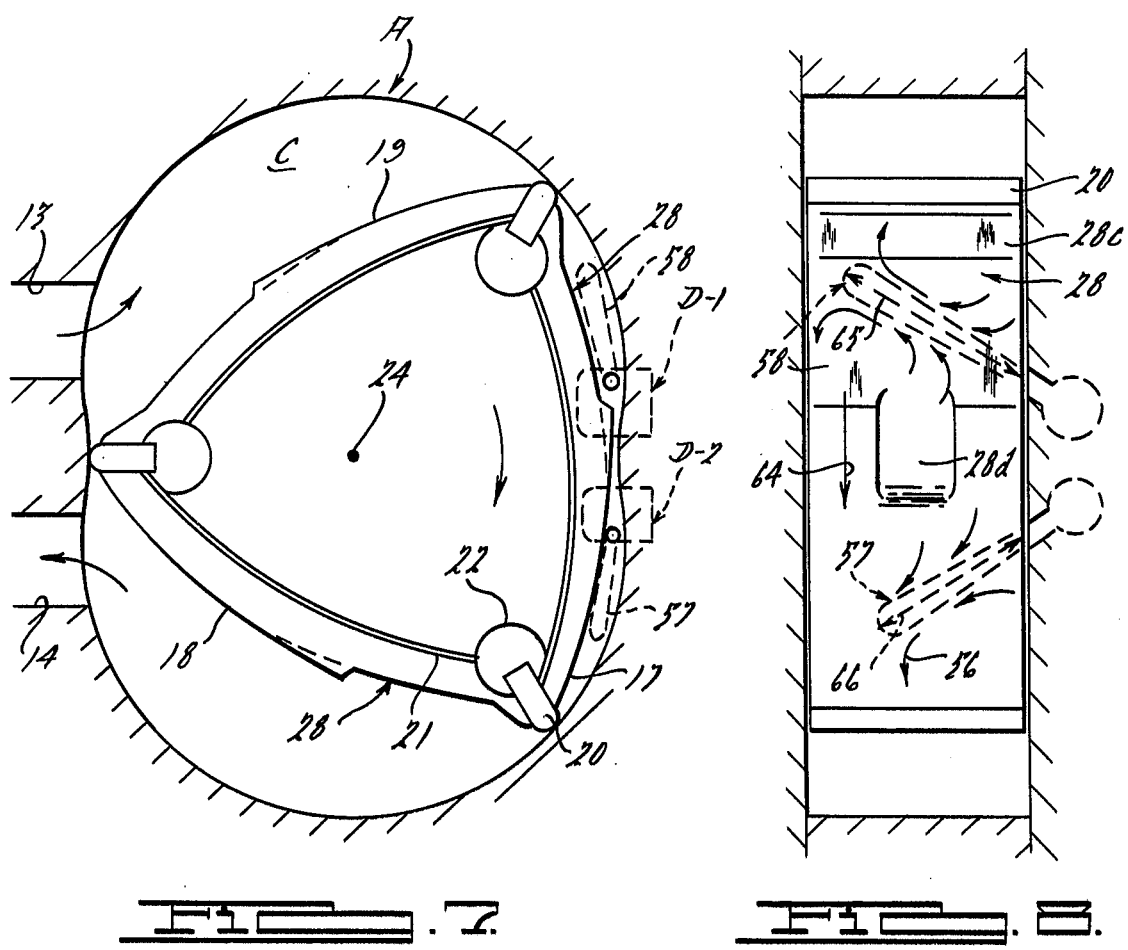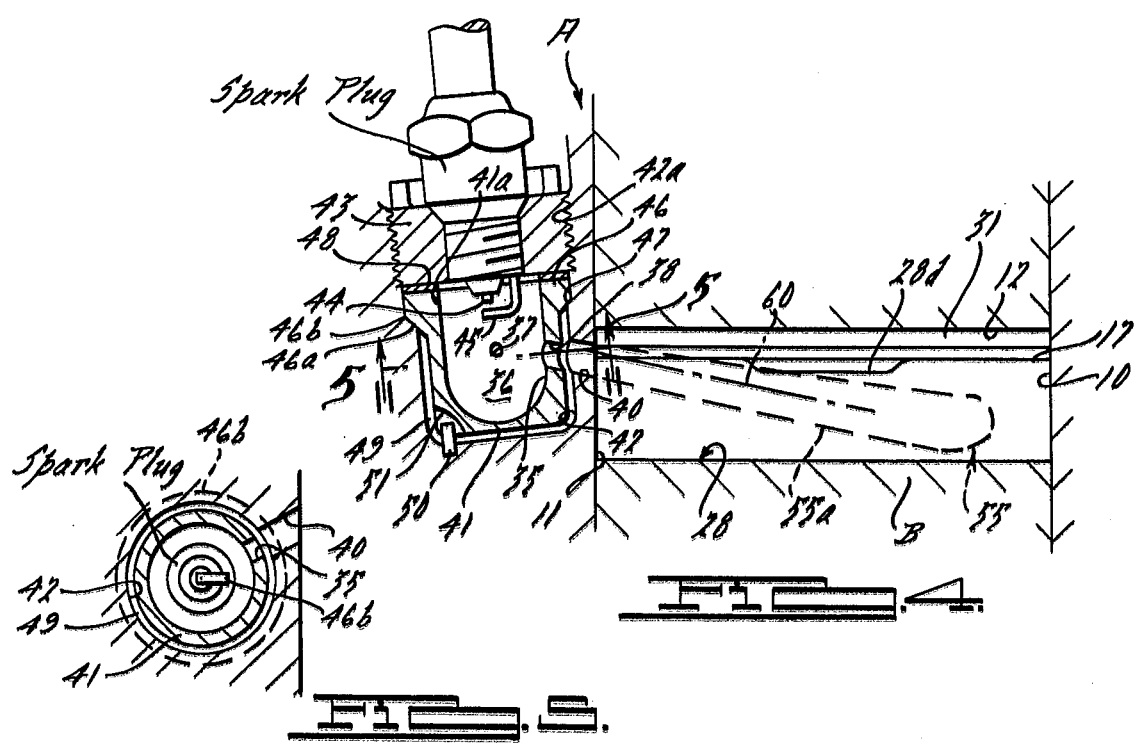

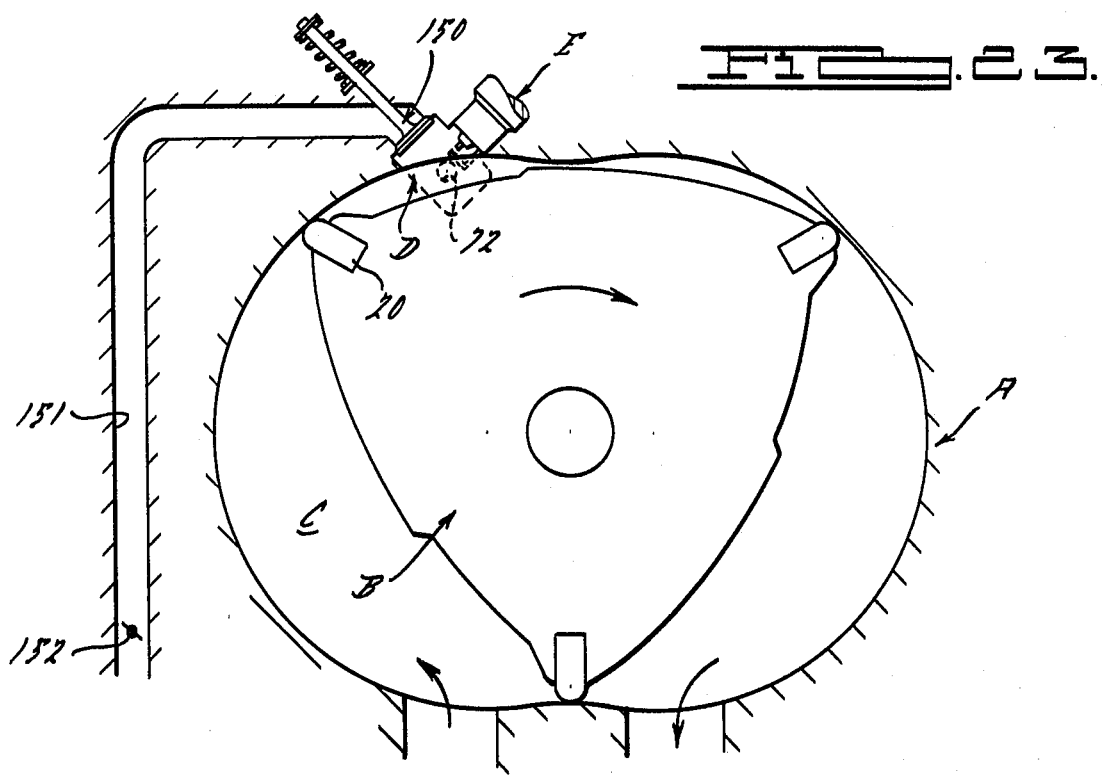
FIG. 23.
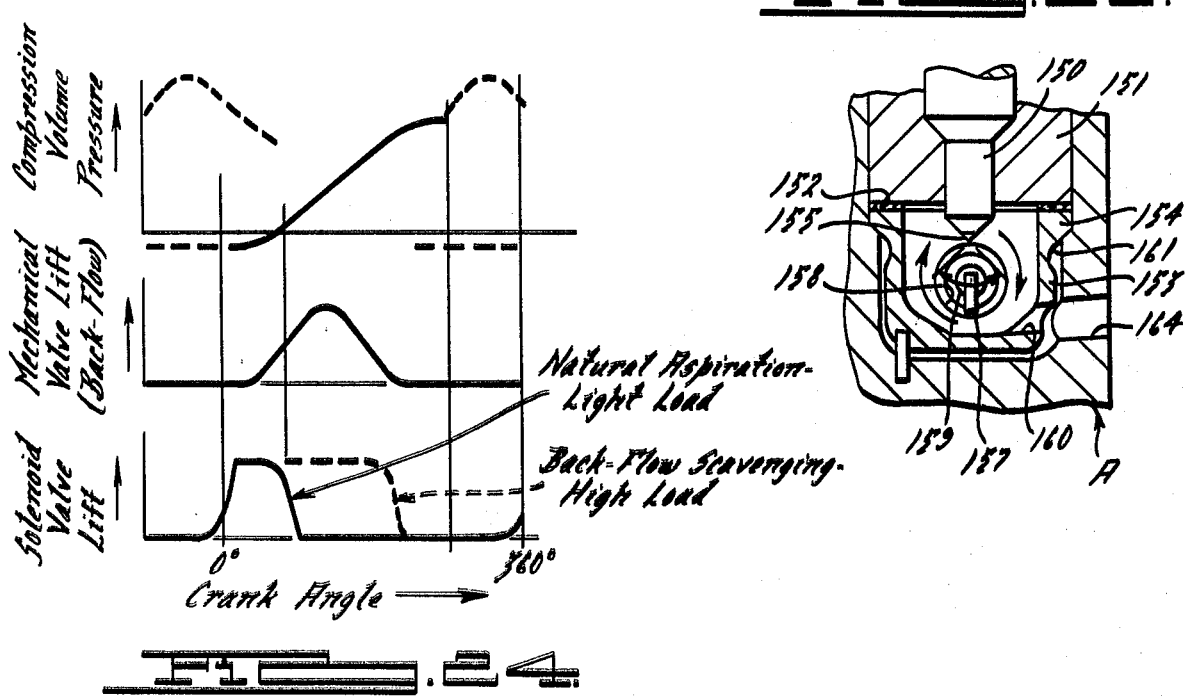
FIG. 26.
FIG. 24.

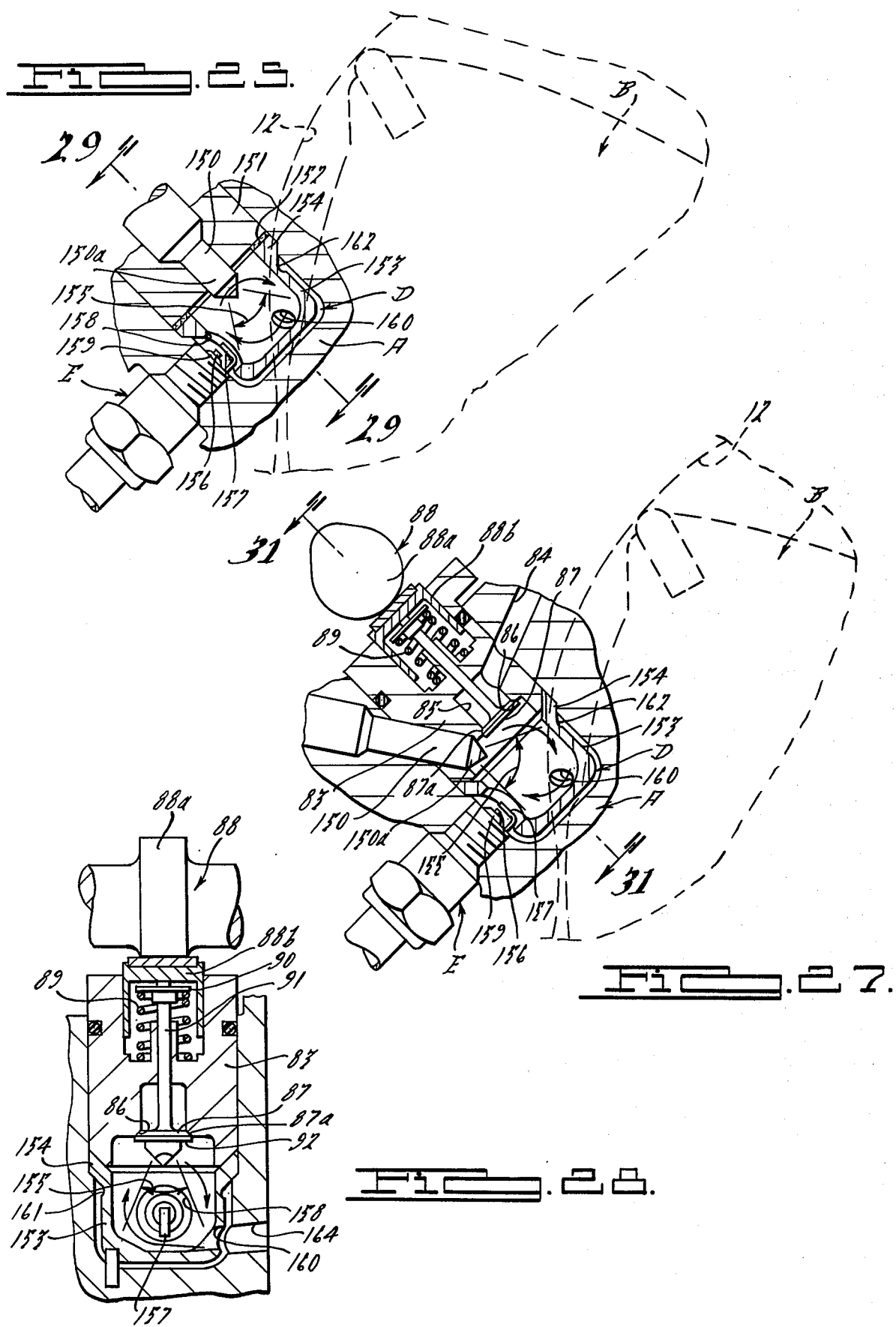

INTERNAL COMBUSTION ENGINE CONTROL SYSTEM

This is a division of application Ser. No. 636,184, filed Nov. 28, 1975, and now U.S. Pat No. 4,060,058.

BACKGROUND OF THE INVENTION

This invention is concerned with improving the speed of combustion in certain localities of a combustion chamber which are now inherently slow. Speed of combustion of a mixture is to be distinguished from the ignitability of the mixture. Ignitability, to a combustion engineer, means momentary oxidation of isolated combustible elements facilitated by an independent heat source. Whereas, speed of combustion, to that same combustion engineer, means the rate at which continuous self-sustained oxidation takes place relying upon self-generated heat to transfer ignition to subsequent combustible elements.

The prior art has done very little to influence or control the speed of combustion in certain selected zones of a four-stroke cycle internal combustion engine, other than to refer to such goal as desirable and best achieved by the right combustible mixture.

As an illustrative example, consider charge stratification in a reciprocating engine in which a relatively lean combustible mixture is inducted into the main combustion chamber with a measured quantity of fuel impregnated into a part of the lean mixture adjacent the spark plug electrodes. The impregnated mixture adjacent the electrodes has excellent ignitability and burns somewhat rapidly until the flame front reaches the lean mixture where it is then slowed down considerably, and possibly extinguished without the ability to be reignited depending on the leanness of the mixture. The overall mean combustion velocity for all parts of the main combustion chamber is thus low while initial ignitability is good. Due to the low mean combustion velocity, the combustion stroke is prolonged leading to negative work and diversion of energy to heat losses rather than to positive mechanical work. As a result, fuel economy and engine efficiency become unsatisfactory.

What is needed is a practical means by which any mixture, lean or rich, can be: easily ignited, efficiently combusted to burn with a predetermined and controllable velocity which may be very fast, if desired, and programmed to have ignition or burning in any zone of the combustion chamber. The prior art has attempted in many ways to obtain these goals. One was by inducing swirl in the combustion chamber resulting from changing the chamber shape but did not realize a significant increase in combustion velocity. Others have tried to change piston motion which resulted in only moderate achievement, and still others are working with centralized high energy ignition sources which require compact combustion chambers, the latter results in less than desirable combustion velocities particularly at lean mixtures.

An increase in combustion efficiency depends upon (1) the expansion efficiency of the combusted gases, (2) heat rejection losses, and (3) the type of working fluid. With respect to factor (3) the working fluid is dictated by commercial realities to be gasoline having certain octane ratings; this results in a triatomic mixture of fuel elements and air when it is burned. To optimize combustion velocity through this factor, a stoichiometric mixture is desirable, but fuel economy, engine efficiency, or emissions usually dictate that an ultra-lean mixture be used in at least a part of the combustion chamber. However, the prior art, in turn, cannot cope with excessively lean mixtures because they either cannot be ignited or lead to slow combustion. Thus, the working fluid must remain in accordance with prior art knowledge. With respect to factors (1) and (2), they are influenced herein by redesign and re-arrangement of combustion apparatus to achieve a controlled increase in combustion velocity and thereby provide better engine efficiency, fuel economy and lower emissions. To simultaneously improve or change the expansion efficiency factor and rejection heat losses, a deeply penetrating and controllable torch is generated having a large moving surface which induces entrainment of the surrounding uncombusted mixture and creates a significant rapid interchange or mixing motion between the combusted flame front and uncombusted mixture without impinging on the walls of the chamber or piston.

The need for controlling the rate of combustion transcends reciprocating engine and is important in a rotary internal combustion engine. The need for controlling the rate of combustion may be even greater in a rotary engine due to the configuration of the main combustion chamber and the dynamics of the gas flow therein. The combustion chamber of the rotary engine is a stretched out volume between the rotor and the rotor housing surfaces. With conventional carbureted spark plug ignition operation, the flame propagation or burning at the trailing end of the combustion chamber is relatively slow. The reason for slow burning is due to (a) the absence of flame-propagating charge motion and (b) the tendency for flame quenching due to small distances between the rotor and the rotor housing surfaces. A high velocity transfer flow of the burning gases takes place from the trailing half of the combustion chamber to the leading half; due to the high rate of mass flow along the large combustion chamber surfaces, a substantial heat transfer takes place from the combustion products to the surfaces. The late and partially quenched combustion at the trailing end causes power losses, fuel consumption increases, and higher than desirable base hydrocarbon emission from the engine.

The common conception that a rotary engine should possess good expansion efficiency by inherently good flow is not entirely true. Expansion efficiency is dependent on good mixing; mixing is a displacement problem and not a flow problem. The continuous rotary flow of gases in a rotary engine does not achieve superior mixing. It is true that local turbulence is created along the flow path of the gases in a rotary engine, but such turbulence (or eddy movement) is not equivalent to a large mass kneading into itself. Rather, such local turbulence can be equated to a vibratory motion of molecules resulting in little net mixing.

Attempts by the prior art to decrease heat rejection losses in a conventional rotary engine by lowering the temperature of combustion through the use of a lean mixture has not resulted in a decrease of fuel consumption. It was hoped that the decrease of the heat rejection losses would result in a more complete combustion process. The inability to achieve a better combustion process at lower combustion temperatures is due to the excessively slow burning rate at the trailing end of the main combustion chamber. Thus, more complete combustion is never achieved. The best fuel consumption in a spark plug ignition rotary engine is obtainable with the faster burning rich mixtures. Data to support this indicates that the best economy air/fuel ratio is usually between 13:1 and 14.5:1.

A structural element herein implementing the ability to achieve a deeply penetrating and controlled torch to obtain improved mixing during combustion in the use of a precombustion chamber, sometimes referred to hereinafter as a prechamber. It is important to point out that precombustion chambers have been successfully used for other purposes in diesel and gasoline engines. In diesel engines, the precombustion chamber has been used to improve fuel vaporization by injecting the fuel onto hot surfaces for thereby promoting mixing between the vaporized fuel and the air. In certain reciprocating engines, such as the Honda CVCC, a prechamber has been utilized to improve the ignitability of moderately lean mixtures. However, the operation and function of the precombustion chamber in this invention is not necessarily to only improve ignitability or to improve fuel vaporization, but rather to increase the velocity of combustion in selected zones of the main combustion chamber, particularly in the trailing end portions of the stretched out volume of a rotary engine. The Honda CVCC prechamber has not been able to generate a high energy flame front proceeding substantially through the main chamber and thus has not, nor was it intended to increase combustion speed. Moreover, the prechamber structural element is employed as fixed elements in the sidewall of the rotary engine not in its annular periphery; all prior art attempts to employ a prechamber have either been in a reciprocating engine (differing substantially with respect to the type of technical problems encountered) or in a rotary engine where it has been employed as a moving cavity in the rotor itself or in the rotor housing periphery requiring a short shallow flame front. Whether based both upon a difference in purpose for the prechamber or based upon differences in physical configuration and location of the prechamber, the prior art has been unable to realize the advantages of combustion velocity control as taught herein.

SUMMARY OF THE INVENTION

A primary object of this invention is to increase the speed of combustion (by both improving the controllability of the speed of combustion and the locality of combustion speed increase) within the combustion chamber of an Otto cycle engine, such increase being beyond the capability of multiple spark plug ignition.

Another object of this invention is to provide an improved rotary engine characterized by increased engine power, decreased fuel consumption and emissions with either or both rich and lean combustible mixtures and without necessarily a change in shape of the combustion chamber.

Another object is to provide combustion apparatus which promotes increase of combustion speed by decreasing heat rejection losses through a combination of delayed combustion and a predetermined increase of compression ratio.

Another object is to provide a combustion apparatus which deploys charge stratification as an additional control of the means to promote an increase in combustion speed.

Still another object of this invention is to achieve the goals of the above objects by utilizing a stationary prechamber into which an ignitable charge is received and out of which a high energy flame torch eminates to not only ignite but more rapidly combust the air/fuel mixture in the main chamber of the engine. The ignitable charge need not be stratified (richer) with respect to the main chamber charge. "Prechamber" shall be a term used herein to identify a zone outside the main combustion chamber in which preliminary combustion takes place to generate a a flame for combusting the gaseous elements in the main chamber.

Another primary object of this invention is to provide a method of controlling the combustion process within a rotary Otto cycle engine which is effective to decrease heat losses during the combustion process and thereby obtain improved fuel economy and reduced emissions. It is a further method object to provide unique control of the combustion process in a rotary engine so that it can operate with lean to ultra-lean air/fuel mixtures, is effective to provide delayed but complete combustion in the chambers thereof, and operates effectively with higher compression ratios.

Specific features pursuant to the apparatus objects of this invention comprise the use of a non-rotating prechamber into which an ignitable air/fuel mixture is introduced under elevated pressure during at least a portion of the compression cycle of said engine; the prechamber is preferably in the sidewall of the rotary engine and continuously communicates with the main combustion chamber of said engine through an orifice, which is closed by the engine's apex seals as they pass thereby; the controllability of the combustion process limits flow through said orifice to, at most, two directional sequences during the compression and expansion cycles; the ignited torch eminating from said orifice into the main chamber, as a result of ignition of a mixture in said prechamber, is increased in energy and penetration by locating the ignition means substantially adjacent the center of the prechamber volume, by using a larger volume to orifice ratio (particularly in the range of 0.005–0.01 $in^2/in^3$) and by reducing heat losses from the prechamber through limitation of the supporting flange conductivity and thereby eliminate temperature fluctuations of the prechamber; the effectiveness of the torch penetrating into the main chamber is increased by a unique orientation of the torch at an angle with respect to all sides of the main chamber, by orientation of the torch to penetrate into the trailing end portion of the main chamber, by maintaining the torch spaced from the walls of said main chamber, and by directing the torch to engage the gaseous quench layers within said trailing portion.

Particular features pursuant to the method aspects of this invention comprise: the introduction of a lean combustible mixture into said prechamber during and at least only for a leading portion of the compression cycle of said engine, the mixture particularly having an air/fuel mixture in the range of 14:1 to 18:1; increasing the energy of said flame torch by providing a fuel containing scavenging gas which is injected into said prechamber during a portion of said compression cycle to eliminate any residual gaseous elements from the preceeding cycles. As an alternative to a fuel-enriched scavenging gas, direct fuel injection may be employed to enrich the prechamber combustible mixture and in part enriching a portion of the main chamber combustion mixture.

DETAILED DESCRIPTION OF THE DRAWINGS

FIGS. 1–5 represent one elemental embodiment of this invention preferred for use with an average rotary engine application. FIG. 1 is a sectional view of a typical rotary engine taken through the central plane of the epitrochoidally delimited chamber, the elements of a rotor, housing and ignition system being schematically represented thereon;

FIG. 2 is a side view of the structure of FIG. 1, taken substantially along line 2—2 thereof;

FIG. 3 is a partial view of the structure of FIG. 1 taken substantially along line 3—3;

FIG. 4 is an enlarged sectional view similar to FIG. 3, but illustrating the prechamber apparatus; and FIG. 5 is a view of the prechamber apparatus of FIG. 4, taken along a line 5—5 thereof.

FIG. 6 is an alternative embodiment for the prechamber apparatus of FIGS. 4 and 5.

FIGS. 7 and 8 are views similar to the views of FIGS. 1 and 2 but representing an alternative embodiment employing dual prechamber arrangements.

Figure 9:
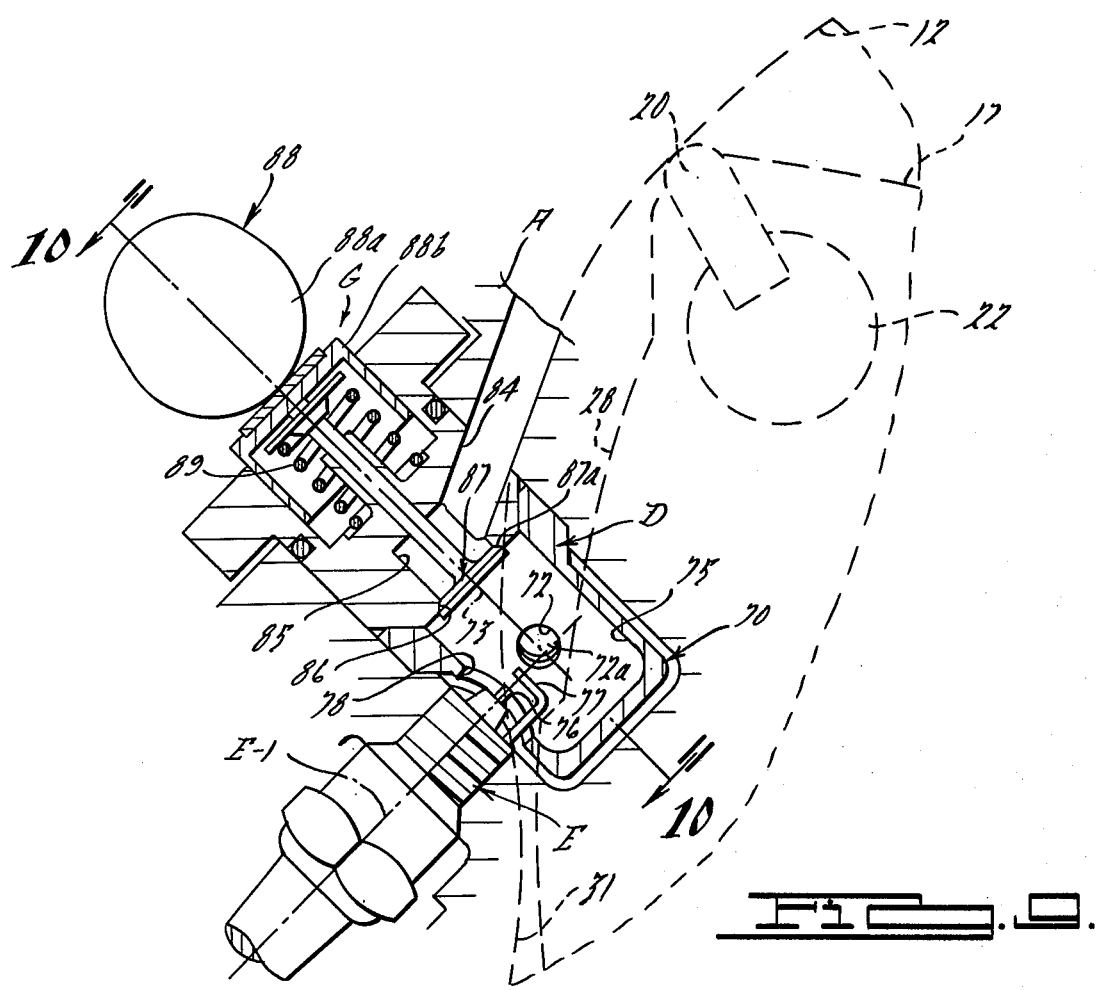
Figure 10:
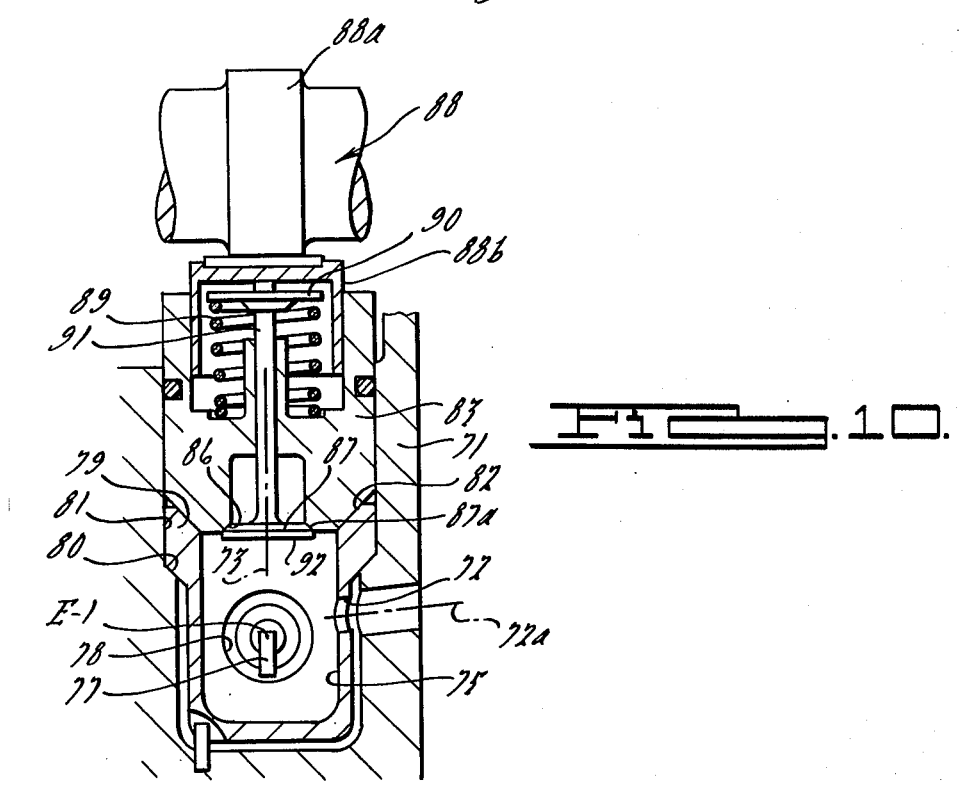
Figure 11:
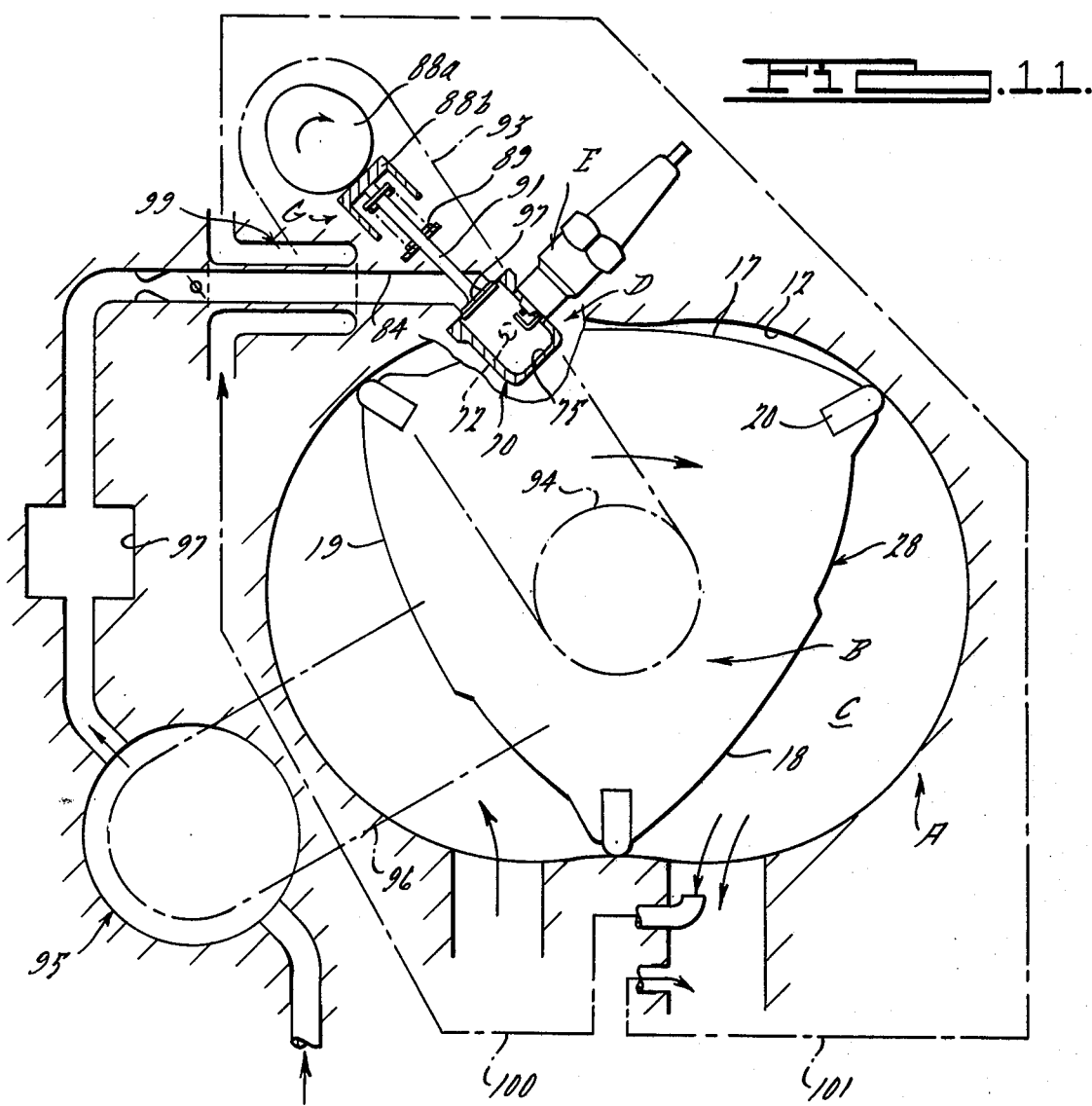
Figure 12:
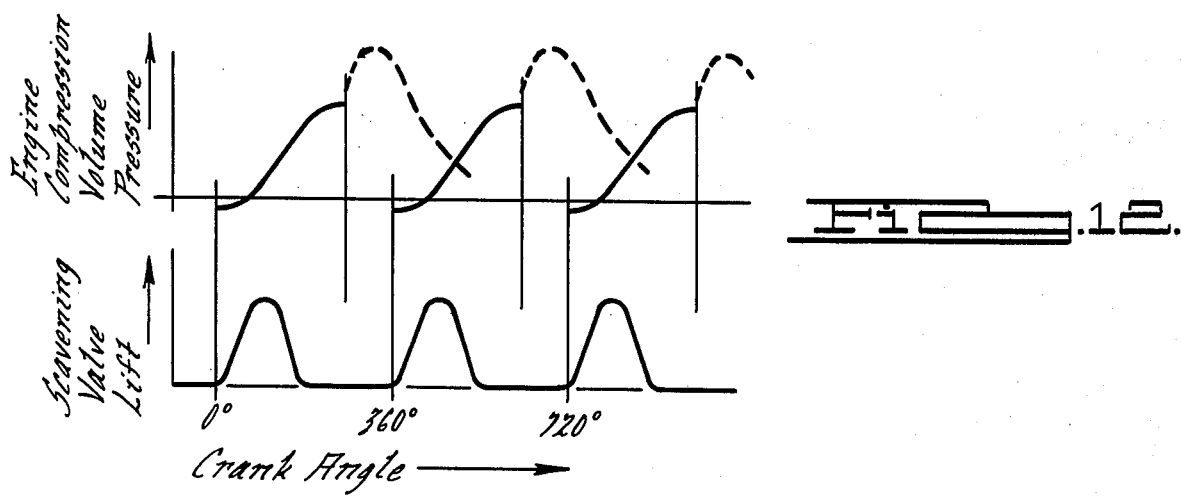
Figure 13:
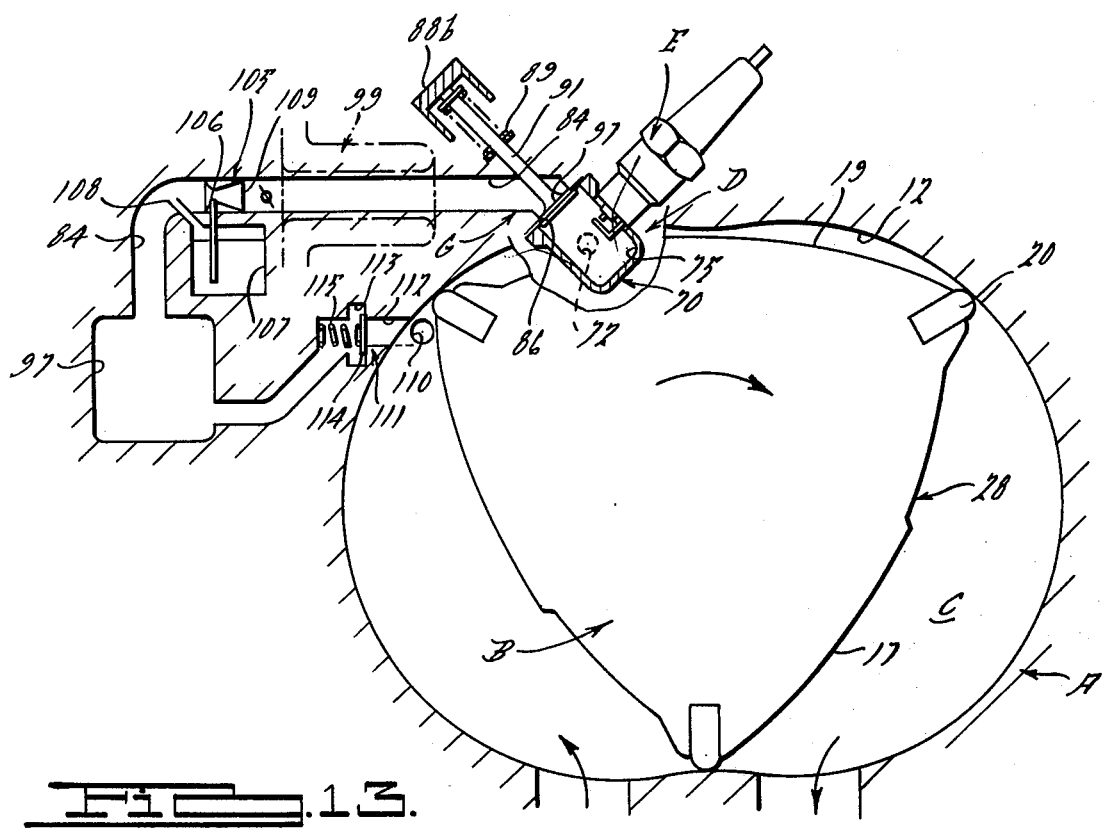
Figure 14:
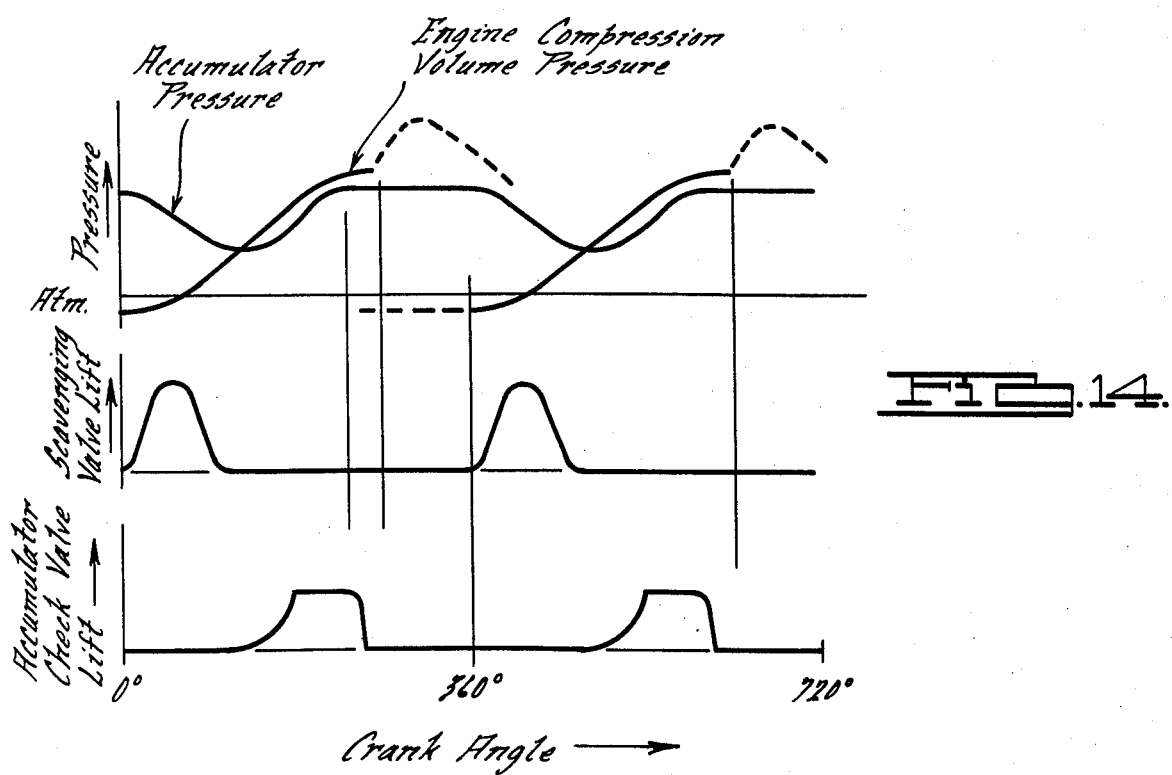
Figure 15:
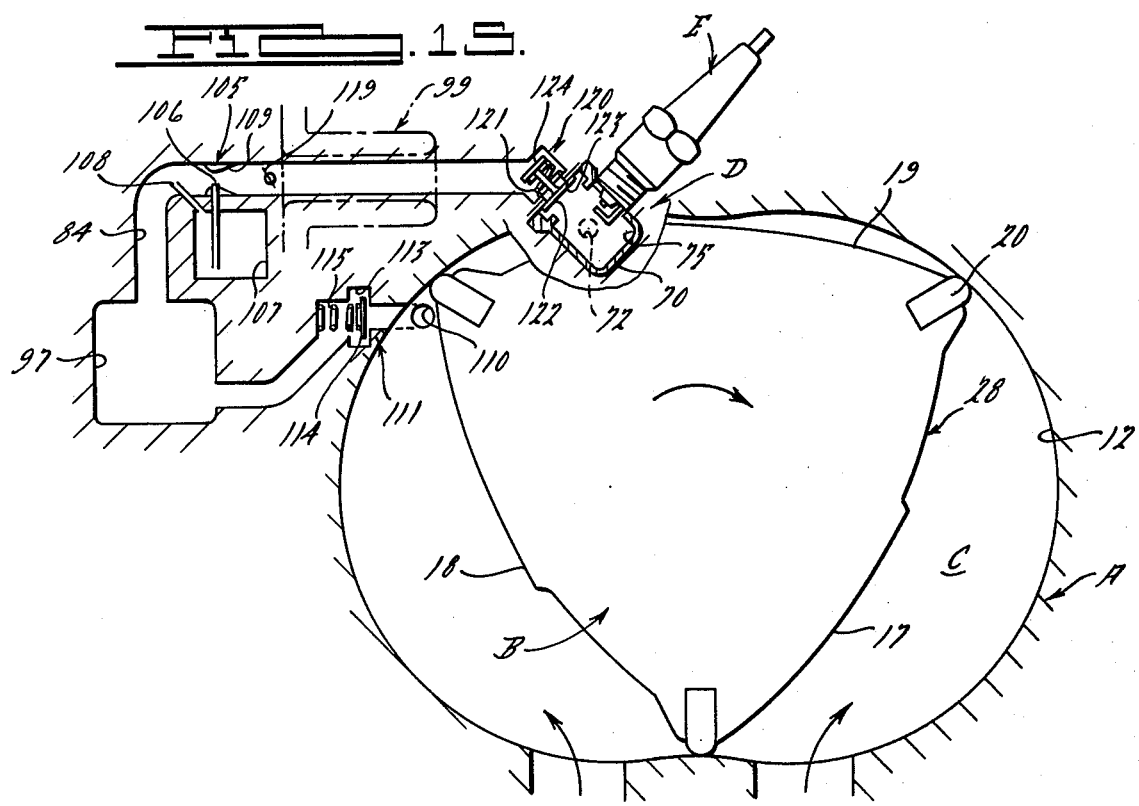
Figure 17:
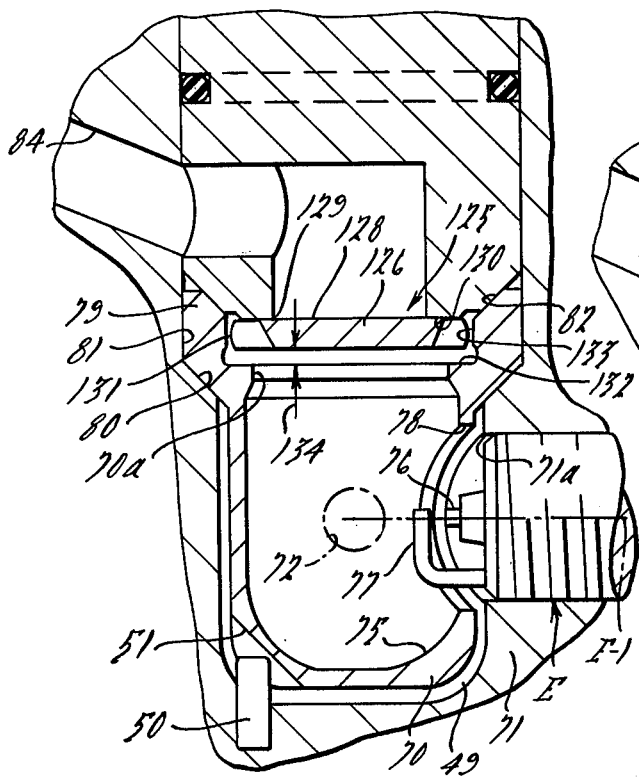
Figure 19:
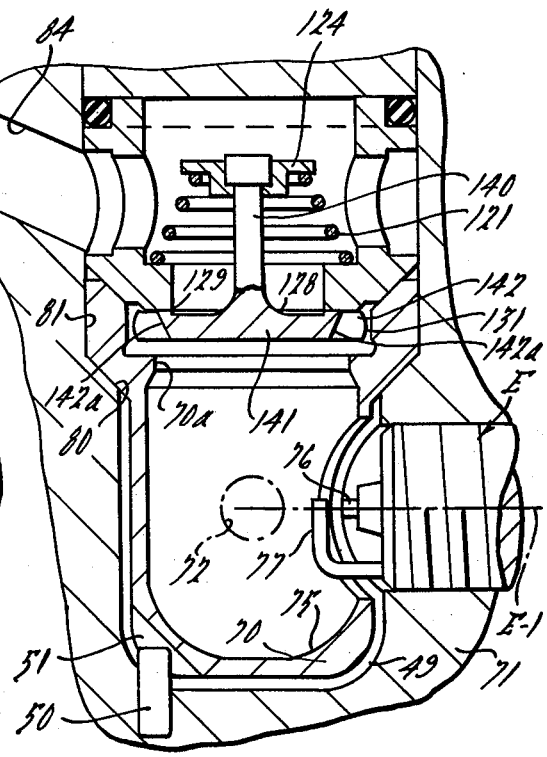
Figure 18:
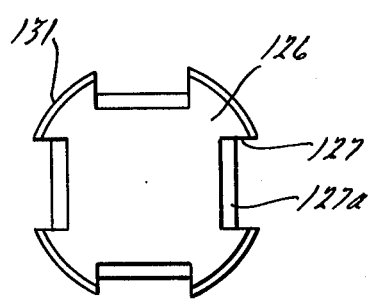
Figure 20:
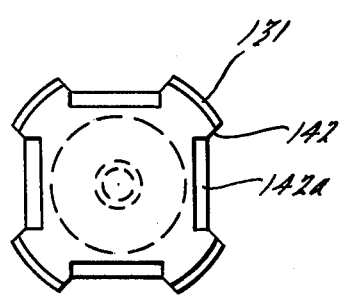
Figure 21:
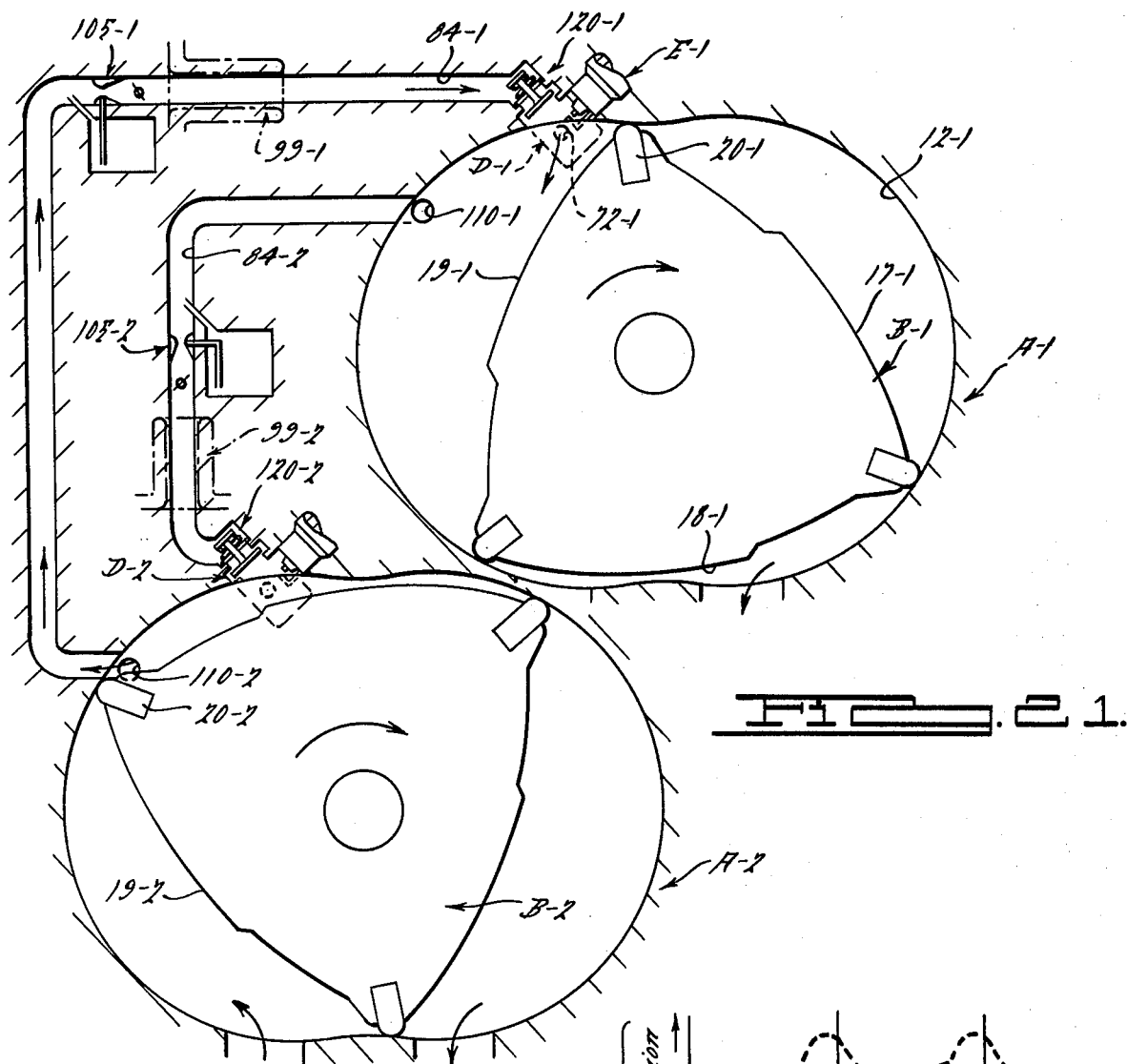
Figure 22:
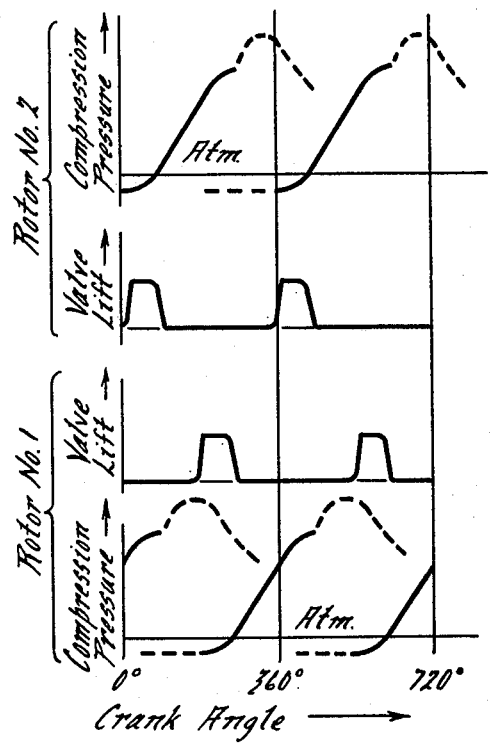

FIGS. 9-23 relate to scavenging apparatus useful with the combustion system and controls of this invention. FIG. 9 is a central sectional elevational view of a preferred scavenging apparatus incorporated as part of the prechamber ignition system and shows a portion of the rotary engine rotor in phantom outline;

FIG. 10 is another view of the apparatus of FIG. 9 taken along line 10—10 thereof;

FIG. 11 is a schematic illustration of a fuel enriched scavenging system useful with the apparatus of FIG. 9;

FIG. 12 is a graph illustrating the variation of engine compression volume or scavenging valve lift with the crank angle of the engine;

FIGS. 13 and 14 are views similar to that of FIGS. 11 and 12 but representing still another alternative embodiment for the scavenging system;

FIGS. 15 and 16 are again views similar to that of FIGS. 11 and 12 representing still another alternative embodiment for the scavenging system;

FIGS. 17 and 18 are enlarged views of one type of check valve useful with the system of FIG. 15; similarly FIGS. 19 and 20 are enlarged views of still another type of check valve useful with the scavenging system of FIG. 15;

FIGS. 21 and 22 are views similar to FIGS. 9 and 10 but representing an alternative embodiment for a dual rotor engine;

FIGS. 23 and 24 are views similar to FIGS. 9 and 10 but illustrating a scavenging system in which the air supply is drawn from the air filter of the engine.

FIGS. 25-28 relate to a fuel injection arrangement which cooperates with the prechamber concept of this invention. FIG. 25 is an elevational sectional view through a portion of the prechamber apparatus of this invention and showing the related engine in phantom outline;

FIG. 26 is an elevational sectional view taken along line 26—26 of FIG. 28;

FIG. 30 is a view similar to that of FIG. 25 but illustrating additional apparatus for providing scavenging of said prechamber; and FIG. 28 is a view taken substantially along line 28—28 of FIG. 27.

DETAILED DESCRIPTION

The most fundamental goal of this invention is to obtain more efficient operation for an internal combustion engine. More efficient operation of an internal combustion engine requires at the least a faster combustion and in many cases it is desirable to use relatively lean or diluted mixtures for reduction of heat rejection losses and engine emissions. This invention achieves such fundamental goal by the creation and use of a controllable high energy torch which is oriented in a novel manner with respect to the combustion chamber of such an engine. It has been further found that such high energy torch and orientation can be best obtained through the use of a prechamber apparatus which facilitates attainment of such controllable high energy torch and further facilitates control of the torch locus for unique orientation. In other words, this invention improves the controllability of the speed of combustion and the locality of combustion, thereby improving engine power, fuel consumption and emissions with both rich and lean mixtures, particularly in a rotary four-stroke cycle internal combustion engine.

A controllable torch with high energy and deep penetration is obtained principally through design of a prechamber in accordance with this invention and having the following unique characteristics: a prechamber shape with an interior spherical volume, the ratio between the prechamber interior volume and the throat area of an orifice communicating said prechamber with the main combustion chamber, the wall temperature of the prechamber, and different modes for enriching the combustible mixture in the prechamber. This invention particularly obtains control of the locus of combustion speed increase by regulation of the direction of the torch, the use of contoured walls or pockets in the main combustion chamber, and the disposition of the communicating orifice either on a radius of the spherical interior volume or by use of a relatively long prechamber nozzle.

This invention has particular utility within a rotary engine. The rotary Otto cycle engine has several advantages possessed by the reciprocating Otto cycle engine and a few more of its own, namely: (a) it is about half the size and weight of a piston engine of comparable power output, (b) it is far less complicated and has a reduced number of parts leading to lower manufacturing costs, (c) by eliminating reciprocating motion in the working parts of the engine, the rotary engine avoids problems of alternating inertia stresses because there are no unbalanced inertia forces, (d) the rotary engine has a high volumetric efficiency advantage over a reciprocating engine because gas flows into and out of the combustion chamber without encountering loops or right angle turns but rather proceeds through a smooth sweep over a longer angle of rotation of the main shaft; it is thus considered a low friction engine.

Although this invention has subject matter which is useful in engines other than that of a rotary epitrochoid type, the embodiments of this invention are illustrated with respect to such a rotary type engine. The combustion chamber of a rotary engine is variable in configuration and is typically a stretched out volume between the rotor and the rotor housing surfaces when in the fully compressed or smallest volume condition. With conventional carbureted spark plug ignition operation, the flame propagation at the trailing end of the combustion chamber is relatively slow. Slow burning is caused by (a) the absence of a flame propagating charge motion and (b) flame quenching due to relatively small distances between the rotor and the rotor housings. The late and partially quenched combustion at the trailing end causes power losses, fuel consumption increases, and higher than desirable base hydrocarbon emissions from the engine. A high velocity transfer flow of the burning gases takes place from the trailing half of the combustion chamber to the leading half; due to the high rate of mass flow along the large combustion chamber surfaces, a substantial heat transfer takes place from the combustion products to said surfaces. This also tends to decrease the engine power and the fuel economy.

In addition, the combustion chamber of a rotary epitrochoid engine translates and is continuously changing in shape and volume because of the rotors planetating motion. The combustion process is accordingly quite different because the combustion chamber has a trailing section which undergoes compression while at the same time expansion is taking place in the leading section of the combustion chamber. This is not true in a reciprocating piston engine since gases therein are always contained in a cylinder area between the valves and spark plug on the one side and the piston crown on the other, and thus is not divided up into two variable portions.

Because of the above two distinctions, the rotary engine is somewhat less controllable according to the state of the art and less capable of providing a variation in the combustion process according to the needs of low, part or full engine loading. The late and partially quenched combustion at the trailing end causes power losses, fuel consumption increases, and higher than desirable base hydrocarbon emissions from the engine. Due to the high rate of mass flow along the large combustion chamber surfaces, a substantial heat transfer takes place from the combustion products to these surfaces. This tends to decrease engine power and fuel economy.

This invention attempts to overcome the above deficiences by increasing the burning rate and decreasing heat rejection in the rotary engine main combustion chamber beyond the capabilities of conventional multiple spark plug ignition. The contribution herein is also suitable to improve fuel consumption, power output and emissions of any Otto cycle internal combustion engine.

The prechamber is one of the basic structural elements of combustion speed control of this invention. Precombustion chambers have been successfully used for other purposes in diesel and reciprocating type gasoline engines. In diesel engines, precombustion chambers are used to improve fuel vaporization by injecting fuel onto hot surfaces to improve the mixing between the fuel and the air. In reciprocating engines, prechambers have been used to improve solely the ignitability of lean mixtures in the main combustion chamber without regard to burning rate or heat losses. Merely accomplishing ignition of a lean mixture in the main combustion chamber of a rotary engine does not necessarily improve engine efficiency or improve emission control. This invention continues to provide the ignitability of lean mixtures in the main combustion chamber, but additionally provides for the controllable increase of combustion speed in engines where the burning rate is slower than desirable with traditional spark plug ignition using the desirable rich wide-open-throttle and lean part-throttle air/fuel ratios. Such controllability of combustion speed is useful with either lean or enriched mixtures in the main combustion chamber.

Turning now to FIGS. 1-5, there is depicted a preferred embodiment of this invention using the most simple basic approach of this invention to provide the best design for an average engine application (average displacement volume) and to achieve an immediate increase of combustion speed. An engine housing A contains a rotor B (driven means) suitably supported for planetary motion within said housing. Variable volume main combustion chambers C are defined between the rotor periphery and the inwardly directed walls of the housing A (including an epitrochoid end wall 12 and parallel side walls 10 and 11). Means D defines a prechamber apparatus associated with ignition means E (FIG. 6). A conventional intake-exhaust system F is employed to induct gases through an intake passage 13 controlled by suction created from the expanding variable volume combustion chamber; similarly, an exhaust passage 14 permits the combusted gases to exit as urged by the contracting variable volume combustion chamber C during the exhaust cycle. Conventional carburetion means 15 may be employed in association with the system F for supplying a predetermined combustible mixture to said main combustion chamber. A conventional emission control device 16, in the form of a thermal reactor or catalytic converter, may be employed to influence the emission gases from passage 14.

The epitrochoid end wall 12 of the housing A is typically coated with a wear-resistant material, such as an electrolytically applied chrome plating, a nickel and silicon carbide mixture, or a bonded liner of such materials. The substrate forming the bulk of the housing is typically aluminum; various techniques have been worked out to maximize the heat conductivity of said housing including the end wall.

The rotor B has a typical triangulated configuration with radially outwardly directed arcuate faces 17, 18 and 19 intersecting at apices at which are located apex seals 20; the apex seals form part of a dynamic sealing system which further includes arcuate seal segments 21 and corner button seals 22 which insure that the gaseous elements of the combustion process are maintained substantially in the main combustion chamber outwardly of said arcuate segments while insuring that the liquid oil cooling system, internally within the rotor, is maintained radially inwardly thereof. The rotor is movably supported to rotate around its own center 23 as well as planetate about an axis 24 of the engine housing. The rotor B has flat side walls 25 and 26 adapted to fit in close alignment with the flat side walls 10 and 11 of the housing. The width 27 of the rotor is substantially commensurate with the interior width 28 of the interior chamber defined by said housing A; such width 27 is typically in the range of 3-4 inches. Although triangulated rotors have contained depressions in each of the generally smooth arcuate faces 17, 18 and 19, such depressions have been located and defined as herein. Here, pockets 28 have a main or principal depression 28a which proceeds uniformly across the entire width 27 of said rotor; the depression 28a has a first tapering floor 28b proceeding from the midsection of each face toward the apex seal at the trailing end of the associated combustion chamber C. A trailing taper 28c of the depression has a more abrupt incline and terminates substantially adjacent the apex seal 28. A smaller depression 28d is centered to provide a gradual inlet to the larger depression 28a and has a width 28e approximately ⅓ the width of the rotor and a length 28f comparable to its reduced width.

The variable volume main chambers C achieve the smallest volume condition during compression at a position as illustrated in FIG. 1. Here the midpoint of the length of the main chamber C-1 is aligned with the minor axis 29 of the epitrochoid wall. In the condition of FIG. 1, the largest height dimension 30 of said pocket is approximately 1/10 the length of the combustion chamber. As a result of the rotary motion of the rotor in the direction of the arrow, as shown in FIG. 1, there is a mass transfer of the gases within the main combustion chamber as shown. There is also a self-induced vortical or turbulent motion of the gases due to the undulations of the walls defining the main chamber, such as lobe 31 and the pocket 28 or openings in the epitrochoid wall 12; such vortical flow reaches a maximum near the minor axis 29.

Conventional ignition systems place spark electrodes in one main chamber sidewall or in the annular periphery; in either case they are located either before or after but closely adjacent the minor axis of said epitrochoid configuration. Such electrode placement requires that the flame front proceed rearwardly as well as forwardly to combust the entire volume of gases in said main combustion chamber; this usually does not occur. Here the ignition system E has a spark plug 31 with a threaded casing 31a received in a metallic closure plug 43 of the prechamber apparatus D.

The prechamber apparatus D, as best shown in FIGS. 4 and 5, is constituted of walls 35 defining a space 36 having a volume considerably smaller than the volume of a main combustion chamber C and having a center 37 located substantially adjacent but upstream of the minor axis 29 (see FIG. 1) of the trochoid and aligned with the inner extremity of lobe 31. The prechamber is provided with an orifice 38 communicating the interior volume thereof with a main combustion chamber C when the latter is in the smallest volume condition, such as shown in FIG. 1. The housing A has a port 40, larger in diameter than the orifice 38, which facilitates such communication, the port is considered in some respects to be part of the orifice arrangement, the port being separately necessitated only by the fact that the interior volume 36 is defined by a capsule 41 and not the housing A.

The surfaces 35 defining prechamber space 36 are formed on the thin wall heat conductive capsule 41. The capsule is preferably constituted of a high temperature metal alloy or the equivalent, and is installed in a generally complimentary, but larger, receptacle 42 in one of the side walls of housing A of the rotary engine; the side walls are typically constituted of cast iron or cast aluminum, each highly heat conductive. The upper end 41a of the capsule 41 is open as is the upper end 42a of the receptacle; these open ends are closed by the ignition means E which may have a threaded plug 43 threadably received in end 42a. The plug 43 carries a spark plug assembly threaded therein, the latter having a pair of electrodes 44 and 45 projecting into the interior space 36 of the capsule. The capsule has an annular flange 46 at the open end 41a which can be conical along an outer surface 46a thereof or any other suitable shape for a tight fit with a mating surface 47 of receptacle housing. The prechamber flange 46 contacts the engine housing directly, as shown at surfaces 46a and 46b. A suitable heat insulating and sealing gasket 48 prevents heat conductive contact with the metal of plug 43 thereby aiding in the temperature control of capsule 41. The prechamber capsule is specifically designed to have a heat insulating gap or space 49 between it and the engine housing at all other locations other than that at surfaces 46a, 46b, and at the gasket. In the event a separate plug 43 is not used to carry the spark plug, the spark plug may be directly received by the housing and the capsule can be provided with separate threads; however, this modification does aggravate the heat transfer problem.

To correctly locate the capsule during installation, a locating pin 50 is installed in the bottom of the receptacle 42; the prechamber capsule is then provided with a slot 51 at the bottom side thereof whereby upon insertion of the capsule mating surfaces 46a with complimentary surfaces, the capsule can be rotated to engage a shoulder or side of slot 5 with pin 50 thereby automatically accurately aligning orifice 35 with port 40. The locating pin can be installed at other suitable points and also any other suitable locating methods can be used which insure correct alignment of the prechamber capsule outlet or orifice with the torch port in the engine housing.

The temperature of the prechamber capsule is controlled so that the ignitability and fast burning of the prechamber charge is aided but does not cause pre-ignition at high engine loads. This is achieved by suitably controlling the heat flow from the prechamber capsule walls (generally uniformly about 0.05–0.1 inches thick) through the contact area (generally 1–2.5 in.$^2$) of the capsule flange with the housing; for greater cooling the thickness of the capsule wall can be varied, the size of the flange contact area with the engine housing can be increased, and the cooling capacity of the system in the engine housing around the prechamber area can be increased (the latter is not shown). Furthermore, the air gap 49 around the prechamber capsule can be made sufficiently small so that the heat expansion of the capsule results in closing of the gap and thereby provide extra cooling when abnormal heating of the capsule occurs. These prechamber capsule temperature control methods can be used in other embodiments of this invention.

Although the precombustion chamber can be constructed without the thin capsule as depicted herein, substantial advantages will still be obtained; but the absence of a capsule will reduce the effectiveness of the flame torch because of the heat losses from the prechamber.

The prechamber designed herein provides for the discharge of a penetrating, high velocity torch 55 into the main combustion chamber in a controlled direction and through the pocket 28. The combustion chamber pocket 28 is constructed in and adjacent the trailing end of each rotor face. The pocket serves three functions; it permits the entering of a torch 55 into the main chamber during a necessary long crank angle interval without directly impinging on the rotor faces; it stimulates entrainment or the induction of a charge circulation about the torch (see arrows numbered 56), which increases the mixing between the burning and unburned charge thereby increasing the speed of combustion; the combustion pocket 28 reduces flame quenching, which would otherwise occur due to the small distances between the rotor housing and the rotor. When combustion is started in the prechamber, the volume of the burning gases therein increase and the gases seek to exit by projecting out of the prechamber volume through the orifice 38 and port 40 which opens into the main combustion chamber as indicated. Even under favorable conditions, the discharging flame torch 55 can be made to penetrate far into the main chamber and cause a secondary charge entrainment motion (see arrows 56 in FIG. 2). If the torch carries a sufficient amount of heat energy, it can rapidly form an increasingly large flame surface in the main chamber due to intensive mixing between the burning and the unburned charge. This process can result in a substantial increase of the burning rate in the vicinity of the flame torch.

The torch shape can be varied to obtain desired results. For example, for a larger main combustion chamber, a greater increase of combustion speed is desired and therefore the torch can be made more penetrating inducing greater entrainment with the larger amount of heat energy. In general, more heat energy is required for leaner mixtures and to obtain a greater increase of combustion speed. The entraining secondary charge motion for mixing the gases of the torch and the unburned mixture should be promoted by combustion chamber shape. Heat losses from the torch to the main combustion chamber surfaces can be minimized by eliminating excessive impingement of the torch against such surfaces.

The port or opening from which and through which the flame torch eminates, has a diameter slightly narrower than the width 59 of the engine apex seal (typically about 0.2–0.3 inches); the centerline 60 of port 40, upon entering the main combustion chamber, is located radially at about a rotor face and is in line with the midline 61 of the combustion chamber in its smallest volume condition. This location prevents leakage between the volumes of the engine when the apex seal passes in front of the torch port hole.

The direction of the torch is controlled by either of two factors: (a) locating the center of orifice 38 on a radius of the generally spherical interior volume 36 of the prechamber, if the orifice happens to have a very short length, or (b) by utilizing an elongated passage 62 (see FIG. 6) defining said orifice 38 which constitutes a nozzle and therefore the centerline 63 of such nozzle can determine the direction of the torch. In any event, the torch is angled with respect to a set of three perpendicular planes passing through an axis of the epitrochoid wall 12. As been shown in FIG. 2, the torch is directed somewhat opposite to the rotor motion, approximately toward the center of mass in the pocket 28 when ignition is timed to obtain the desired compromises between fuel economy and emissions. At the same time, the discharge velocity of the torch and also the heat energy of the torch is adjusted to be sufficiently high to provide the necessary increase of combustion speed. In order to maintain high effectiveness of the torch ignition, the torch is directed between the rotor and the rotor housing surfaces to prevent the kinetic energy losses and the heat energy losses from the torch from being excessive.

In the case of large displacement engines and in the cases where efficient combustion of either substantially leaner than stoichiometric mixtures or highly diluted mixtures are desired, two flame torches 57 and 58 can be generated from prechamber D-2 and D-1 respectively, such as illustrated in FIGS. 7 and 8. Here the higher energy primary torch 58 can be used for the trailing portion and the lower energy secondary torch 57 for the leading portion of the main combustion chamber. The torches are directed oppositely, the primary torch being directed counter to the direction 64 of flow, and rotation of the rotor, the other being generally directed in somewhat the same direction of rotation and flow of gases into the leading portion. Note, the difference in energy between the two torches is somewhat illustrated by the differential lengths 65 and 66 of the torches. For still larger displacement engines and for still greater increase of combustion speed, three, four and more torches can be used according to the above principals of this invention.

The specific structural design of the precombustion chamber is influenced by the following important considerations:

(1) The prechamber outlet or orifice size is used to control torch penetration and discharge duration. A smaller area orifice or outlet results in a higher discharge velocity and greater penetration up to a certain limit. An excessively small orifice area is avoided because it causes an excessively delayed torch discharge rate and an eventual decrease of penetration. In addition, the heat energy losses to the outlet surfaces may become excessive. Excessively high penetration is avoided because it would cause high velocity impingement on the remote combustion chamber surfaces causing excessive heat energy losses from the torch.

(2) The choice of a prechamber volume is used to control the torch heat energy. A larger prechamber provides greater torch heat energy. In the rotary engines, the total volume of the prechamber must and should be typically less than 50% of the total of any main combustion chamber volume because a certain minimum volume necessarily exists between the rotor and the rotor housing surfaces. It has been found that a volume ratio between 12 and 45% is operable for the purposes of this invention.

(3) Control of the prechamber wall temperature is utilized to affect torch penetration and affect torch heat energy to a small degree. A higher prechamber wall temperature will increase the prechamber charge temperature; this increases the ignitability, the burning rate and the rate of gas expansion in the prechamber. Consequently, the torch discharge velocity and the penetration both increase. The high limit of prechamber wall temperature occurs at the onset of pre-ignition usually at wide open throttle while operating with rich mixtures. The walls of the prechamber of this invention are sufficiently cooled to avoid auto ignition (by heat extraction through the flange contact area or predetermined side wall contact and by radiation losses to a water cooled housing).

(4) The direction or orientation of the torch is controlled primarily by the relative position of the precombustion chamber outlet to the prechamber volume. In the case of a short outlet passage, such as an opening in a thin wall capsule, the natural centerline of the torch should substantially coincide with a radius of the spherical portion of the prechamber volume passing through the center of the orifice. It is preferred that the outlet area of the orifice be nearly perpendicular to this radius. If the outlet area (transverse section) is arranged on a surface which is substantially not perpendicular to this radius, the torch direction is less certain and the torch tends to dispurse as penetration tends to decrease. Therefore, the prechamber volume and the outlet area, in the case of a short outlet passage, should be located (a) so that the radius between the center of the prechamber volume and the center of the outlet substantially coincide with the intended direction of the flame torch and (b) with the outlet area preferably substantially perpendicular to this radius.

In some applications of this invention, it may be required that the torch be directed differently from the natural direction of the torch. This may be desired where fuel is injected into the prechamber, even though the primary combustible mixture enters from the main chamber through the orifice or passage; a toroidal mixing is desired therein and this can best be achieved by a passage being located on a tangent or a chord of the spherical portion. In FIG. 6, a discharge passage 62 with a substantial length 62a and a substantial length to diameter ratio is made. The elongated outlet passage 62 is preferably heat insulated from the metal of the cooled engine housing. The elongated passage 62 without heat insulation can be used successfully in certain less critical cases. This, however, causes a certain heat energy loss from the torch thereby somewhat decreasing its effectiveness. The port 64 in the housing again is slightly larger in diameter than the passage 62 to prevent torch heat losses and is located on the centerline 63 of the passage.

(5) The preferred shape of the prechamber outlet is a single circular hole or passage. Two or more equivalent area circular holes or an elongated slot may also be used successfully. Improvements can be achieved either by discharging two or more torches in different directions from the same location or by discharging a flat torch between nearly parallel close surfaces. However, deviations from the circular discharge hole tend to decrease the torch penetration and increase heat energy losses due to the greater surface of the discharge passage.

One of the main distinctions of this invention over the prior art is the manner in which the prechamber is filled with a combustible mixture. Since the only communication to the prechamber during the compression cycle of the engine is through an orifice means (such as 38 and 40 of FIG. 4) communicating with the main combustion chamber, the only mixture that can enter the prechamber is the mixture that is inducted by a conventional induction system 15 of the engine. In the event such inducted mixture is relatively rich (containing a small amount of unvaporized fuel particles) the prechamber design of FIG. 6 is preferable to employ. Here the orifice 62 is located on a centerline 63 which may be a tangent or chord of the spherical interior volume 35 at the bottom of the capsule. This tends to induce a toroidal mixing within the prechamber as the prechamber is fed with gases during compression and assists further vaporization. For the embodiment of FIGS. 1-5, it is considered a substantially unstratified charge type prechamber construction; a lean carburated charge may be inducted first into the main chamber and thence to the prechamber. The lean mixture is ignited in the prechamber because of the higher concentration of heat transferred from the capsule walls to the prechamber charge and due to the presence of the sparking means E.

PRECHAMBER SCAVENGING

Torch penetration and torch energy can be increased by reducing the residual gas content of the prechamber charge through the use of various degrees of scavenging as defined herein. FIGS. 9-24 are devoted to various embodiments providing for this effect. An unscavenged prechamber, in accordance with the earlier embodiments, is charged wholey or partially from the main combustion chamber mixture and as a result will contain trapped combustion products from the previous cycles. Consequently, the residual gas content of the charge for the prechamber will include (a) the residual percentage of the main combustion chamber charge and (b) 8-15% of the trapped residual gas originating in the prechamber itself. By decreasing the residual gas content of the prechamber, the amount of burnable mixture and also the burning rate will increase in the prechamber and this will increase both the torch penetration and the torch heat energy.

FIGS. 9-12 illustrate a first scavenging system and structure. A prechamber capsule 70 is installed in the slide wall 71 of the engine housing similarly to the unscavenged design of the earlier embodiments.

The ignition means E and outlet or orifice 72 each have centerlines E-1 and 72a respectively, which are arranged substantially at right angles to each other and at a right angle to the centerline 73 of valve actuation for a scavenging mechanism or means G. The capsule 70 has a relatively thin wall 74, the orifice 72 has a short length and is generally located on a radius of the interior rounded or generally spherical portion 75; the electrodes 76 and 77 project into the interior of the capsule of the prechamber means D and lay on the centerline E-1. An opening 78 is provided through the capsule to permit said electrode projection. A flange 79 of the capsule provides for contact with the housing at conical surface 80 and cylindrical surface 81; in addition, conical surface 82 on the flange mates with a complimentary conical surface of a supporting insert 83 for the means G. The predetermined insulating gap surrounding the capsule to control capsule wall temperature is in conformity with previously discussed principles.

The scavenging mechanism G is effective to control a scavenging gas passage 84 disposed in the housing A and in the supporting insert 83; the passage 84 enters a valve chamber 85 which communicates with the capsule at a central location through valve opening 86 defined by the conical valve seat. The valve 87 has a conical surface 87a which is operable to close the valve opening 86. Thus, the scavenging valve opens into the prechamber interior volume and this is accomplished periodically by operation of a cam mechanism 88 which overcomes the force of a spring 89 operating to normally close said valve; the spring 89 has one end bearing against the insert 83 and another end bearing against a shoulder 90 secured to the valve stem 91 causing the valve 87 to be urged upwardly (in FIGS. 9 and 10). The mechanism 88 has a cam 88a effective to cyclically urge member 88b downwardly, overcoming the spring force, to open valve 87. The cam 88a can be driven by belt 93 taking its power from the eccentric shaft 94 of the engine (see FIG. 11).

The operation or movement of the prechamber scavenging valve can be controlled by means other than the cam mechanism 88 illustrated in FIGS. 9 and 10. Such other means may include an electrical solenoid and a suitable electrical power switching system. The use of such an electrical solenoid and power switching system is made more feasible in a rotary engine environment because the pressure differential across the scavenging valve face 92, which tends to help both opening and closing of the valve 87, is large under all operating conditions including wide open throttle. In addition, the solenoid can be triggered substantially before valve opening because combustion pressure will tend to keep the valve closed even against the magnetic force of the solenoid.

The prechambers, discussed heretofore, are located adjacent the trailing half of the main combustion chamber when the main combustion chamber is substantially in its smallest volume. Thus, the prechamber orifice or outlet can discharge the torch through a sufficiently long crank angle (100°-180°) duration that permits efficient increase of the combustion speed as illustrated in the graphical illustration of FIG. 12.

The system of this embodiment (see FIG. 11) has the scavenging passage 84 connected to a gas compressor 95 (driven by belt 96 also from shaft 94) to provide for a scavenging gas supply; the compressor 95 pressurizes a gaseous mixture from the intake system of the engine (such as from carburetor 15 or simply from ambient air and transfers it into a small volume gas accumulator 97 under a pressure greater than the intake manifold pressure. From the accumulator, the gas is introduced or released into the prechamber when the scavenging valve 97 is open. Complete vaporization of the pure mixture in passage 84 is assured by a heat exchanger 99 or heating jacket arranged to surround passage 84; the heat exchanger receives hot exhaust gases via conduit 100 and circulates the gases about passage 84; after releasing heat, the gases are delivered via conduit 101 back to the exhaust system of the engine. The exchanger may alternatively utilize engine coolant.

The scavenging valve 97 is operated by the cam synchronized with the engine eccentric shaft. As shown in FIG. 12, the scavenging valve 97 opens during the time when the prechamber outlet is exposed to the engine volume which is at the very early stage of its compression period. It remains open until the compression pressure approximately equals the scavenging gas pressure. During the scavenging period, the scavenging gas, which is a pure intake mixture, drives the residual gases out of the prechamber and into the main combustion chamber. The capacity of the scavenging compressor 95 should be sufficiently large to deliver an amount of scavenging gas at a pressure suitably greater than and at a volume suitably greater than the pressure and volume of the prechamber. At the end of the scavenging period, the precombustion chamber is filled with a pure mixture. During the remainder of the compression stroke, additional mixture will enter the prechamber from the engine volume. This additional charge contains some residual gas; however, at the end of the compression stroke, the prechamber will contain less residual gas than the main combustion chamber.

In general, the higher the scavenging gas pressure generated by the compressor, the lower the residual gas content of the prechamber. The compressor permits substantially greater scavenging then in the naturally scavenged prechamber characteristic of piston engines. Furthermore, the scavenging gas passage may be provided with a throttle valve control for controlling the scavenging gas flow if desired under some operating conditions.

A further increase in the prechamber charge ignitability, torch penetration and torch heat energy, can be realized by increasing the prechamber charge richness through fuel additions to the scavenging gas. A stoichiometric or somewhat richer mixture in the prechamber increases the ignitability, the rate of burning and the rate of volume increase therein. The torch discharge velocity thereby increases and so does penetration; torch heat energy increases because it contains more fuel. The fuel that is added to the prechamber scavenging gas is nearly fully evaporated by the time it enters the prechamber. This is desirable in order to decrease the excessive cooling of the prechamber wall by the liquid fuel and also to minimize deposit formation in the prechamber and on the spark plug.

To this end, a small secondary carburetor 105 having a throttle 119 is installed with a fuel outlet 106 entering upon a venturi 109 in the scavenging gas passage 84 as shown in FIG. 13. The float bowl 107 of the carburetor is vented at 108 to the scavenging gas passage 84. The fuel supply pressure to the secondary carburetor is suitably regulated according to the variable float bowl gas pressure required. The fuel addition is, in this way, regulated to have a variable input of fuel enrichment to the scavenging gas passage which corresponds to the scavenging gas pressure flowing across and through the passage 84. The fuel addition would provide a constant mixture ratio if used with an accumulator maintained at a certain pressure by a compressor. Here, the accumulated pressure is derived from the chamber C.

An important variation of the scavenging system in FIG. 13 is the self-scavenging effect. The scavenging gas is taken from and supplied by the compression volume of the engine through port 110 and a light weight scavenging accumulator check valve 111. The scavenging port is located in one of the side walls of the engine housing A, near the rotor housing. The size of the port is suitably small so that the width of the apex seal 20 can fully cover it. The scavenging port is located so that it is exposed to the compression volume of the engine substantially up to the end of the compression period. The apex seal 20 passes it slightly before the combustion begins.

Passage 112 communicates with port 110 with the chamber 113 for the valve 111. A check valve disc 114 is urged by a spring 115 to maintain closure until a pressure differential is achieved to overcome the spring. Dependable operation of the check valve is assured because pressure to assist its opening is high under all engine operating conditions. With this design, fresh carbureted main chamber charge mixture fills the volume of the scavenging accumulator 97 nearly up to the compression peak pressure (see FIG. 14). At the beginning of the next compression stroke, the prechamber outlet or orifice 72 is exposed to the compression volume. At this time, the scavenging valve 97 is opened by a cam or solenoid (whichever the case may be) and the pressurized scavenging mixture expands into the prechamber driving out the residual gas into the lower pressurized compression volume. With this design, the percent of residual gas content of the prechamber is equal to that of the main combustion chamber because the scavenging gas is taken from the engine charge. However, the residual content is less than that of the unscavenged precombustion chamber.

The fuel addition to the scavenging gas passage can be accomplished by other auxiliary systems, such as other types of pressure carburetors, continuous fuel injection or pulse control fuel injection with the highly simplified control system. An interesting variation of the embodiment of FIG. 13 includes taking the scavenging gas as fresh air from the engine air cleaner. This system can be successfully applied either without or with addition of fuel in the scavenging gas passage. When fuel is added, intensive heating of the scavenging gas between the point of fuel introduction and the precombustion chamber is necessary. Heating by the exhaust gas is advantageous because as high as 300° to 500° F passage wall temperature can be used for complete vaporization of fuel in very rich scavenging gas mixtures. The heat exchanger 99 thus will take on a configuration much like an extension of the exhaust manifold. As mentioned earlier, complete fuel vaporization is desirable to avoid excessive deposit formation in the prechamber and to decrease excessive cooling of the prechamber capsule walls.

Figure 16:
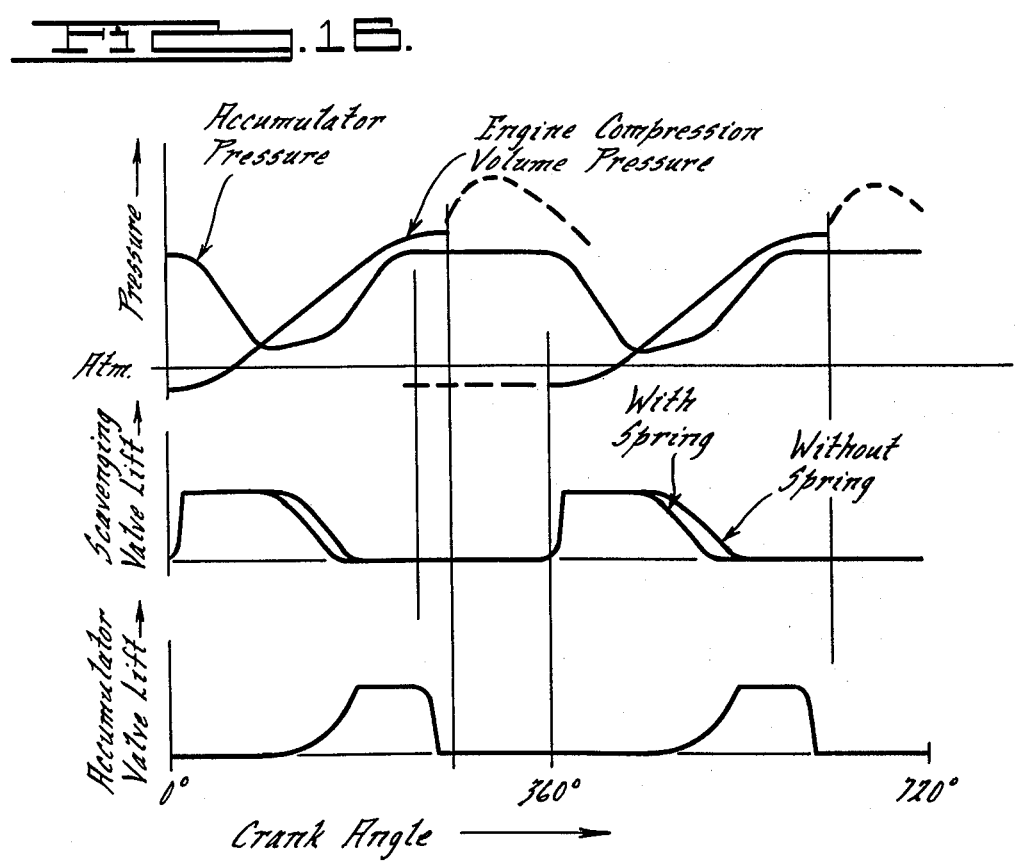

To further simplify the self-scavenging concept, the cam or solenoid operated scavenging valve, can be subplanted by a check valve 120 used to accomplish scavenging control, as illustrated in FIGS. 15 and 16. To this end, the scavenging check valve 120 will open into the precombustion chamber volume. The valve has an enclosed valve element 122 normally urged upwardly by spring 121 to seal along its margin against the snnular shoulder of opening 123; the spring has one end bearing against disc 124 carried on the valve stem.

During combustion, the high gas pressure in chamber C and a suitably weak spring 121 will keep the scavenging check valve closed (see FIG. 16). When the power cycle is substantially progressed, the engine rotor turns and the prechamber outlet or orifice 72 will be exposed to the compression volume of the engine in the early stage of the compression period. At this time, the compression volume pressure is substantially lower than the pressure in scavenging accumulator 97 which is nearly equal to the compression pressure. The pressure difference is substantial under all operating conditions of the engine. It is thereby sufficient to overcome the inertia of the scavenging check valve 120 and scavenging will be accomplished during the early portion of the compression period. In the later stage of the compression period, the prechamber scavenging check valve 120 will close, and the scavenging accumulator check valve 111 will open whereby the scavenging accumulator volume will be refilled nearly to the compression peak pressure. The use of such a prechamber scavenging check valve 120 is significantly facilitated in rotary engines over piston engines. In rotary engines, the pressure differential that opens and closes the prechamber check valve 120 will be high under all operating conditions including wide open throttle; in the piston engine the pressure differential decreases with increasing load.

Yet still a more simplified contribution to a scavenging system for a prechamber embodiment is the use of a free floating check valve 125 as shown in FIGS. 17 and 18. The valve 125 has a flat disc 126 with slots 127 spaced circumferentially thereabout. The inner wall 127a of each slot is tapered as shown but arranged to provide a solid impervious surface 128 to close opening 129 when engaged with shoulder 130. The outer edge 131 of the valve is constructed with a semi-spherical surface. The valve seat is in the flat bottom surface of the precombustion chamber retainer. The top of the prechamber capsule 70 is made with a step 70a to provide the check valve with an open-position limiting surface 132. The diameter of the prechamber capsule space 133, above the step 70a, is made slightly larger than the diameter of the valve 125 to provide for piloting of the valve. The stroke 134 of the valve is made relatively small so that during pressure reversals, the valve rapidly assumes either one of its extreme positions. The slots around the valve edge serve as flow passages when the valve is in the open condition. The semi-spherical edge 131 serves to prevent wedging of the valve to an uncontrollable condition. The contact between the valve disc 126 and the valve seat 130 is sufficiently large to assure effective cooling of the valve body; the contact area is at least 15% the area of the valve throat.

A spring loaded version of the prechamber scavenging check valve is shown enlarged in FIGS. 19 and 20. The construction is similar to the free floating check valve. A check valve stem 140 extends from the center of the valve disc 141 normally closed. The disc has slots 142 with inwardly disposed walls 142a tapered. This design permits increasing the closing spring by a suitably made valve spring which may be desirable for high speed operation.

For those rotary engine embodiments which will have two rotors, the scavenging system can be that as shown in FIGS. 21 and 22. The scavenging port 110-1 and 110-2 of each rotor chamber is connected to the prechamber scavenging valve of the other rotor (120-2 and 120-1 respectively). The scavenging flow takes place because, at the time compression pressure is high in one rotor pressure volume, it will be low in the other rotor compression volume. Therefore, two scavenging transfer check valves (such as 111 in FIG. 15) are not needed. However, two secondary fuel systems (105-1 and 105-2) are required for scavenging mixture enrichment. The prechamber valves 120 can either be mechanically or solenoid actuated and either one of the check valve designs of FIGS. 17 or 19 can be employed.

To obtain natural aspirated scavenging and backflow scavenging, the embodiment of FIGS. 23 and 24 can be employed. When applied for backflow scavenging, the scavenging valve 150 for the prechamber can be either cam actuated or solenoid actuated. The scavenging valve 150 is connected by a passage 151 either to the air cleaner or the intake manifold of the engine. During the combustion period (as shown in FIG. 24), when the prechamber is exposed to the combustion volume of the engine, the scavenging valve 150 is opened. Consequently, a leakage flow takes places from the compression volume through the prechamber and the scavenging valve back into the lower pressure intake system. The backflow purges the residual gases out of the prechamber and replaces with engine charge mixture. Consequently, the residual gas content of the prechamber is equal to the main combustion chamber. Enrichment of the prechamber is not possible in this application; the rate of scavenging backflow is controlled either by a small throttle valve 152 in the scavenging line or by a fixed orifice. When the system of FIG. 23 is used for a combination of naturally aspirated and backflow scavenging, the scavenging valve should be actuated by a solenoid in combination with a variable timing triggering system (not shown). In addition, the scavenging passage 151 should be connected to the air cleaner and should include either a small carburetor or some type of secondary fuel injection system (not shown). Under light load operating conditions, when the manifold vacuum is high, the scavenging valve should be opened as soon as the apex seal uncovers the prechamber outlet into the compression volume of the engine. At this time, preferably, the intake period is still in progress; during the initial stages of the compression period, the charge pressure is still below the atmospheric due to the high manifold vacuum. Consequently, a period of time exists during which scavenging flow takes place from the air cleaner through the prechamber into the engine volume. Since fuel is added to the scavenging flow, the prechamber is scavenged and filled with rich mixture. The scavenging valve will then close before the compression pressure reaches a point where substantial backflow will take place. This naturally aspirated scavenging can be maintained only within the lower portion of the load range. At high loads, when the manifold vacuum is low, the scavenging flow rate and the duration of the favorable pressure difference decreases. Above a certain load point, scavenging of the prechamber is only partial. Efficient operation with only partially scavenged or unscavenged prechambers is possible under certain less critical conditions. However, under some conditions, it is useful to provide backflow scavenging for the prechamber at high loads. In this case, the duration of the scavenging valve opening is increased so that efficient backflow scavenging is provided above the desired manifold vacuum level.

FUEL INJECTION

A practical attempt by the prior art to provide a stratified charge in a rotary engine, including both lean and rich mixture phases, has included (a) the use of direct fuel injection and (b) two separate carbureted mixtures into a trochoid chamber. To facilitate either of the above approaches, a supplementary chamber has been defined; this typically has consisted of a trailing chamber located behind the main pocket in the rotor (the latter acting as the main combustion chamber). Fuel injection has been the sole means of introducing fuel directly to the combustion chambers in the epitrochoid chamber; the main chamber actually obtains a somewhat lean mixture because the main chamber expands slightly ahead of the trailing chamber. The principal disadvantage of the direct fuel injection approach has been improper distribution of the air/fuel mixture; it fails to accurately provide for proper distribution of the air/fuel mixture at all loads and speeds.

The disadvantages of the two carbureted approach is the added structural expense and inability to provide accurate control and placement of the mixtures.

Direct fuel injection, according to this invention, into the mixture of the prechamber, requires adherence to several unique control principles if torch effectiveness is to be increased with increasingly leaner main chamber mixtures.

1. Since the fuel spray introduced into the prechamber will consist of liquid fuel particles, the entire heat of vaporization of the added fuel must be provided in the prechamber. To obtain the desired elevated prechamber mixture temperature and also to provide heat for rapid vaporization of fuel droplets including those which hit the prechamber surfaces for efficient mixing and reduction of deposit formation, heat conduction from the prechamber capsule to the capsule flange must be and is suitably regulated by proper selection of the capsule thickness. The regulated capsule wall temperature is sufficient for rapid fuel vaporization and mixing yet is not excessively high so that pre-ignition at high loads occurs.

2. To minimize deposit formation on the spark plug, the plug electrodes are located in the prechamber relative to the fuel injector nozzle to minimize and avoid impingement of liquid fuel on the spark plug electrodes. At the same time, the spark gap, between the electrodes, is located centrally in the prechamber volume to assure consistent ignition of the prechamber charge.

3. To promote rapid vaporization of the fuel droplets which may strike the prechamber surfaces and to promote rapid mixing of the developing fuel vapor with the prechamber charge, the fuel spray is preferably directed so that the liquid fuel droplets are deposited on a large area of the hot portion of the prechamber capsule surface.

4. The location of the prechamber outlet or orifice is utilized to promote mixing in the prechamber volume in addition to controlling the direction of the torch according to the previously described principles. To promote mixing between the vaporizing air-born fuel droplets and also the fuel vapor film developing on the prechamber surfaces from the charge of the main chamber, the prechamber outlet orifice is located on a tangent or chord of the spherical portion thereof; this promotes swirling or a toroidal mixing motion as the mixture enters the prechamber from the compression volume of the engine.

In addition, the shape of the prechamber volume is configured to promote the effectiveness of the mixing charge motion.

5. The shape, penetration and droplet sizes of the fuel spray influence the rate of vaporization and mixing. Minimum droplet size is preferred for rapid vaporization. However, the small droplet size cannot be utilized for rapid vaporization if the droplets are not properly dispersed within the gaseous charge. Since the volume of the prechamber is relatively small, an excessive spray particle velocity that results in an excessive spray penetration, even with very small particle sizes, would cause the deposition of excessive liquid fuel on the prechamber surfaces. Furthermore, either an excessively low penetration or an excessively narrow spray cone angle could cause high concentration of the liquid fuel within which the rate of vaporization would be relatively slow due to the high local partial fuel vapor pressure and due to a low rate of heat flow to the liquid fuel. The uniform mixing of such concentrated fuel distribution in general takes a longer time than a more dispersed one. A very wide spray cone angle may also be disadvantageous because it could cause concentrated depositing of liquid fuel on the surfaces adjacent to the fuel injector nozzle. The cone angle should therefore be limited to at least 75°–140°.

Consequently, the fuel droplet sizes of the fuel spray used in the precombustion chambers of this invention are preferably in a small size range. The selection within the small size range is made with respect to desired fuel spray penetration and spray cone angle which results in a suitable degree of dispersion of the fuel droplets within the volume of the prechamber for a preferably high rate of vaporization and mixing. This high rate of vaporization must be sufficient to avoid excessive accumulation of deposits in the prechamber and to minimize particulate carbon formation and emission due to burning of large quantities of liquid fuel droplets.

6. The temperatures of the fuel injector nozzle must be controlled. Usually a small quantity of liquid fuel is left on the tip of the fuel injector nozzle after the end of injection. Under unfavorable conditions, deposits from the liquid fuel may accumulate on the nozzle tip which can cause substantial deterioration of the fuel spray characteristics. To avoid deposit formation, the liquid fuel from the nozzle tip is evaporated as effectively as possible. The vaporization is controlled by suitable protrusion of the fuel injector nozzle into the volume of the prechamber. A greater protrusion results in a high nozzle tip surface temperature and a greater exposure of the nozzle tip to the mixture motion which is useful to carry away the vapors formed on the nozzle tip surfaces.

Excessive protrusion of the nozzle tip may result in an excessively high temperature for the rest of the nozzle body and vapor development in the liquid fuel contained in it. Such vapor formation may cause erratic injection. To decrease this possibility, the metal parts in which the nozzle body is mounted may be intensively cooled and excessive protrusion of the nozzle tip may be avoided.

Consequently, the direct fuel injector nozzles used in this invention for enrichment of the precombustion chamber mixtures are preferably mounted so that the nozzle body is sufficiently cooled to avoid vapor formation within the nozzle. At the same time, the tip of the nozzle is sufficiently protruded into the prechamber volume that the liquid fuel from the nozzle tip is effectively evaporated and the vapors carried away so that no accumulation of deposit occurs under normal operating conditions.

FIGS. 25 and 26 illustrate a preferred embodiment of an unscavenged precombustion chamber with direct fuel injection mixture enrichment according to the above described principles. The injector nozzle 150 is supported in a retainer element 151 closing the open end of the capsule except for the nozzle opening. The nozzle tip 150a slightly protrudes into the volume of the prechamber; here defined by the interior of capsule 153. The prechamber retainer element 151 is insulated from the capsule by gasket 152 to increase heat flow from the capsule 153 through the prechamber capsule flange 154 to the engine housing A. The prechamber capsule is connected to its flange by a somewhat reduced thickness section 161 to somewhat decrease the heat flow from the lower portion of the capsule to the flange.

The fuel spray cone angle 155 is relatively wide (here 75°) and has an axis passing through the center of the prechamber spherical volume so that some of the highest penetrating fuel droplets will be deposited on a large area of the lower located high-temperature portion of the capsule 153. The spark plug 155 is mounted with electrodes 156 and 157 near the flange 154 of the prechamber capsule and within the capsule opening 158 so that impingement of liquid fuel on the electrodes and the insulator 159 is minimized. The prechamber outlet or orifice 160 is located at the bottom of the capsule so that a swirling mixture motion is generated in the prechamber when mixture enters it from the compression volume of the engine. This mixture motion promotes mixing between the fuel vapors and the entering charge. Port 164 is larger and axially aligned with orifice 160.

Fuel injection will take place during the compression period of the engine. The fuel nozzle may be supplied with fuel and the quantity of fuel may be controlled by any conventional or nonconventional, mechanical or electric, correctly operating direct fuel injection control system. A disclosure of a typical fuel injection system is shown in U.S. Pat. No. 3,820,517 and is incorporated herein by reference.

FIGS. 27 and 28 illustrate a version of this invention which uses a scavenged precombustion chamber with mixture enrichment provided by direct fuel injection. This version applies the same principles as the unscavenged direct injection prechamber illustrated in FIGS. 28 and 29 with the exception of the scavenging.

Any of the previously described scavenging methods may be used. The fuel is injected either during or after the end of the scavenging period. However, fuel injection is timed sufficiently in advance of the ignition so that sufficient fuel vaporization and mixing can take place in the prechamber and so that particulate carbon formation, emissions from the engine, and deposit accumulation in the prechamber will be minimized.

In those versions of this invention where fuel is added to the charge of the prechamber, the fuel addition will be increased with increasing load although not necessarily in linear proportions. The exact rate of fuel addition is controlled according to the desired increase of torch energy as a function of load. This is normally dependent on the desired balance between fuel consumption, engine power, emission control, engine design and cost considerations pertinent to the particular application of the engine.

An efficient flame torch can be also obtained with addition of a constant small amount of fuel to the charge of the prechamber independently from the load. This system is useful mainly with fuel injection to simplify the auxiliary fuel system controls. In general any other type of fuel rate control can be usefully applied provided that it does not cause excessive stratification.

The torch system can also be operated effectively with fuel addition to the charge of the prechamber only and with main combustion chamber is charged only with air. This type of fuel control is preferred for part load operation. To fully utilize the entire oxygen content of the main chamber charge, addition of fuel to the main chamber charge is preferred for maximum load operation.

As described above, one method of this invention to improve fuel consumption, power output and emissions improvements in rotary engines by the increase of combustion speed especially at the trailing end of the combustion chamber. Faster combustion permits operation with leaner or highly diluted mixtures which result in a decrease of the combustion temperature. Further fuel consumption, power output and emissions are provided by an additional method of this invention through reduction of the heat rejection losses during combustion. This additional method is a combination of a delay of combustion timing so that it takes place somewhat after top dead center and a suitable increase of compression ratio. In rotary engines, the volume change from top dead center to bottom dead center is completely sinusoidal. Consequently, the beginning of expansion from top dead center is substantially slower compared to piston engines. In addition, the charge transfer velocity from the trailing half of the combustion chamber to the leading half is high at or near top dead center. Consequently, the residence time of the combustion products under condition of high velocity along the rotor housing surface is relatively long and the heat rejection during a conventionally timed combustion period is relatively high. Retarded combustion decreases heat rejection by decreasing the time duration of the flow of combustion products (high-velocity high-temperature types) aalong the rotor housing surface. The retarded combustion in itself would decrease the expansion efficiency of the engine. This is prevented by increasing the compression ratio suitably so that the intended expansion efficiency is restored. The compression ratio can be increased because the danger of detonation and auto ignition is relatively low in rotary engines since engine charge is only moderately heated during the intake and compression strokes. The increase of compression ratio only slightly increases the engine friction because the combustion peak pressures are not increased.

EMISSION CONTROL

All of the previously described versions of this invention are capable of increasing the rate of combustion and improving the engine efficiency when operating with relatively lean mixtures. Consequently, all versions are capable of improving (reducing) the engine emissions. However, different design versions may influence the emissions in different ways and to different degrees.

Due to leaner operation, the CO emission generally decreases. However, if excessive charge stratification is applied which may result from introduction of excessive amounts of enrichment fuel into the prechamber, the excessively rich portion of the mixture may not be efficiently mixed with the cylinder charge and the CO emission may increase. Consequently, the preferred degree of charge stratification is such according to the principles of this invention which does not result in excessive CO formation.

With the leaner operation, the base engine HC emission generally decreases. At the same time, the exhaust gas temperature also tends to decrease. However, the exhaust temperature of the rotary engine is inherently higher than that of the piston engine under equally lean operating conditions. This is a direct consequence of the lower heat rejection losses from the exhaust gas in the exhaust port. The heat rejection losses are less because the number of exhaust ports and the related total exhaust port head rejection surface area is less in the rotary engine compared to the gasoline engine, based on equal exhaust flow rates. Consequently, any exhaust after treatment device that requires high exhaust temperatures for effective operation inherently operates more efficiently and maintains efficient operation with leaner mixtures and higher combustion efficiencies in the rotary engine compared to the piston engine.

Even with the inherently higher exhaust temperatures, it is possible to improve the efficiency of the rotary engines by the methods of this invention to a high degree where the exhaust gas temperature becomes lower than desirable for the exhaust after treatment devices. In such cases, either the effectiveness of the torch can be decreased or the ignition can be retarded or the compression ratio of the engine can be decreased. In general, the efficiency of the engine may be decreased if no other effective method can be incorporated in order to gain exhaust gas temperature.

As is well known, the unburned HC emission originates from the quench layers of the engine in the main combustion chamber. The basic principles of this invention includes decreasing of the quench layers by forming a combustion chamber pocket at the trailing end of the main chamber where the quenching is the greatest and increasing the completeness of combustion by the introduction of the flame torch. This reduction of the quench layers results in a substantial decrease of the base engine HC emission. For further HC emission reduction an additional method can be used according to the principles of this invention.

Mixture formation and consequently the mixture quench layer formation in the main combustion chamber can be nearly avoided by the direct injection precombustion chamber versions of this invention when it is operated with fuel introduction only into the prechamber and with fresh air supply only into the main chamber at light loads. Under this condition, nearly fully burned mixture enters the main combustion chamber in the form of the flame torch. Substantial quench layers can form only within the precombustion chamber. The prechamber quench layer does not contain much unburned HC because the prechamber capsule wall temperature is relatively high. In addition, most of the prechamber quench layer remains trapped in the prechamber because the diffusion of the layer takes place after the prechamber content is already discharged and because the prechamber outlet is not open into the engine expansion volume when the expansion pressure becomes very low. However, when the prechamber outlet is exposed to the compression volume, either a portion or all of the prechamber residual gas content is discharged into the engine compression volume. The residual gas possibly contains some partially burned and unburned HC. Part of this HC may be quenched during the next combustion period causing some unburned HC emission. This HC emission can be minimized by as high prechamber capsule wall temperature as possible without causing pre-ignition.

In general, the HC emission from the above described secondary HC emission source is substantially lower than HC emission from the usually formed quench layer. Therefore, the unique very low HC emission version of this invention operates with either scavenged or unscavenged precombustion chamber preferably including a relatively high controlled surface temperature capsule. The fuel is introduced into the prechamber by direct fuel injection during the compression period of the engine. At a certain portion of the part load range, fuel is introduced only into the prechamber and the main volume of the engine is filled with air only. The quantity of fuel injected into the prechamber is proportional to the load. At high loads fuel is introduced also into the main combustion chamber. The quantity of fuel in the main chamber increases with increasing loads.

As well known, the NOx emission of the internal combustion engines strongly depend on the combustion temperature. Relatively small decrease of combustion temperature results in a large decrease of NOx emission. Consequently, the mixture leanness and the mixture dilution by exhaust gas recirculation which decrease the combustion temperature are very effective means of NOx emission control.

A second factor effecting NOx formation is the concentration of oxygen in the already burned gases. With rich mixtures, the NOx emission is usually low because the oxygen concentration in the combustion products is low. With very lean mixtures, the NOx emission is also low. Although the oxygen concentration is high in the combustion product, the rate of NOx formation is low because the combustion temperatures are low due to the high quantity of excess air in the mixture. Because of the opposing effects of the oxygen concentration and the excess air, the NOx emission is usually the greatest at a certain slightly leaner than stochiometric A/F ratio and it decreases with both richer and leaner mixtures.

When exhaust gas recirculation is used, the relationship between A/F ratio and NOx emission is altered. Low NOx emission can be obtained with any practical A/F ratio provided that sufficient amount of exhaust gas can be recirculated without causing excessively slow combustion.

The above described NOx emission control methods used generally in internal combustion engines can be successfully used with all versions of this invention. Small differences in NOx emission may occur between the different versions of this invention depending on the control of combustion in the precombustion chamber.

With scavenged precombustion chamber operating with slightly leaner than stochiometric A/F ratio, the NOx emission may be slightly higher than with either unscavenged or rich A/F ratio operation.

PREFERRED METHOD ASPECTS

A preferred method for increasing the combustion speed of an Otto cycle internal combustion engine comprises:

(a) providing at least one prechamber in said housing, said prechamber having an orifice communicating with each of said variable volume combustion chambers when the latter are in substantially their smallest volume condition, defining said prechamber to have a substantially spherical volume portion with the centerline of said orifice lying on a radius of said spherical portion, (b) inducting a combustible mixture into each of said main combustion chambers during the induction cycle of said engine, (c) introducing a predetermined quantity of combustible mixture into said prechamber during at least a portion of the compression cycle of said engine, said introduced mixture being equal to or richer than the inducted mixture, said introduced mixture being at a pressure equal to or greater than the pressure in said main combustion chamber at the moment of introduction, and (d) igniting the introduced mixture in said prechamber substantially at a locus adjacent the center of said spherical portion for generating a flame torch eminating from said orifice and directed into said adjacent main combustion chamber during the combustion cycle of said engine, said flame torch having a length greater than any transverse dimension of said main chamber, said torch being arranged to stimulate a vertical entraining motion of the unburned mixture surrounding said torch in the main combustion chamber.

The torch should preferably be directed into at least a part of the trailing portion of the main combustion chamber and should be arranged to engage quench layers residing therein without contacting the walls of said main chamber.

A preferred method for increasing the speed of combustion and the completeness of combustion, comprises additionally:

(a) insulating the prechamber against substantial heat conduction to said housing whereby the temperature of the walls of said prechamber is maintained between 350-800, (b) inducting a lean combustible into said main combustion chamber during the induction cycle of said engine, said lean combustible mixture having an air/fuel ratio in the range of 14.6:1 to 18:1, (c) permitting said inducted mixture to be introduced to said prechamber through said orifice during at least a portion of the compression cycle of said engine, (d) removing residual gases from said prechamber during at least a portion of said compression cycle by the introduction of an independent pressurized supply of gas, said removal of residual elements from said prechamber thereby insuring a slightly enriched mixture within said prechamber in advance of said combustion cycle, and (e) igniting the mixture in said prechamber after the removal of said residual elements for generation of a flame torch eminating from said orifice and directed into said main combustion chamber during the combustion cycle of said engine, said flame torch having sufficient length to stimulate a vortical entraining motion of the unburned mixture surrounding said torch in the main chamber.

The pressurized gas supply can be enriched with an independent quantity of fuel whereby increased stratification is achieved; the enrichment can be performed later or even after the scavenging function to insure a substantially enriched content in the prechamber.

A preferred method for controlling the combustion process of a rotary engine to reduce emissions, comprises:

(a) provide walls in the housing of said engine to define a prechamber having an orifice arranged to be in communication with each variable volume main combustion chamber when each of said main combustion chamber is in substantially the smallest volume condition, each main combustion chamber being a leading and trailing portion viewed with respect to the direction of compression, (b) inducting a lean combustible mixture into said main combustion chambers during the induction cycle of the engine, (c) permitting said inducted mixture to be introduced to said prechamber during at least a portion of the compression cycle of said engine, (d) igniting the introduced mixture in said prechamber for generating a flame torch eminating from said orifice and directed into at least the trailing portion of said main chambers during the combustion cycle of said engine, said flame torch having a sufficient length to stimulate a vortical entraining motion of the unburned mixture surrounding said torch in the main combustion chamber, whereby the emission content of said engine (for a lean mixture, small type engine without catalysts) will have a carbon monoxide content no greater than 20 g./mile, an unburned hydrocarbon content no greater than 3.0 g./mile, and a nitrous oxide content no greater than 4.0 g./mile. These quantative limitations are associated with one type of engine and without catalysts. By making modifications or tradeoffs according to the description on pages 45-49, these limitations will accordingly change. Additional fuel is introduced directly into said prechamber independent of said main combustion chamber during a part of the compression cycle of said engine. A portion of said introduced fuel results in an enriched combustible mixture and a portion of which passes into said main chamber during a part of said compression cycle thereby preventing excessive stratification of the charge within said main combustion chamber prior to combustion, whereby the carbon monoxide content of said emissions is further reduced.

The carbon monoxide content of the emissions of said engine can be further reduced if additional fuel is injected into the mixture in said prechamber prior to ignition, resulting in a rich mixture in said prechamber with an air/fuel ratio at least 14.6:1, but richer than the air/fuel ratio in said main combustion chamber.

A preferred method for reducing the residual gas content in a prechamber used as part of the ignition system for a rotary internal combustion engine, comprises:

(a) provide continuous communication between said prechamber and main chamber undergoing compression, (b) induct a combustible mixture into said main chambers during the induction cycle of the engine, and (c) introduce a predetermined quantity of air into said prechamber during the compression cycle of said engine, the quantity of said predetermined air being greater than the volume of said prechamber, said introduced air being at a pressure greater than the pressure of the air inducted into said main combustion chamber at the time of introduction, whereby residual gas elements in said prechamber are pneumatically flushed from said prechamber into said main combustion chamber.

We claim:

1. A prechamber fuel injection system for use in an Otto cycle rotary internal combustion engine having wells defining a main combustion chamber which undergoes rotation and translation, the combination comprising:
(a) a heat conductive thin wall capsule having a generally spherical interior portion and an open end opposite said spherical portion,
(b) means for selectively providing spark ignition within said capsule and having spark ignition electrodes arranged on an axis and with a gap therebetween projecting into said prechamber,
(c) fuel injection means arranged to close the open end of said capsule except for a heat conductive nozzle extending centrally through said closed end, said fuel injection means being effective to inject a conical spray of fuel droplets into said prechamber with the axis and spread of said conical spray arranged to prevent concentrations of droplets throughout said prechamber and to prevent direct contact of droplets with said electrodes,
(d) walls defining an outlet from said capsule through which a gaseous mixture from said main combustion chamber of said engine is introduced to said capsule, said outlet having an axis generally tangent to the spherical interior volume of said capsule to induce toroidal flow upon introduction of said gaseous mixture from said main combustion chamber, the axes of said cone, spark electrodes and outlet are each at generally right angles with respect to each other.

2. The combination as in claim 1 in which said fuel injection means has a nozzle effective to provide a conical spray of fuel droplets comprised of uniformly very fine droplets.

3. The combination as in claim 1, in which said fuel injection means has said nozzle arranged to project into said capsule a predetermined distance to obtain a higher nozzle temperature.

4. The combination as in claim 1, in which said fuel injection means provides for a spray cone having an included cone angle of no greater than 140°, but no less than 75°, the diameter of said capsule spherical interior portion being no less than 1.2 inches and no greater than 1.6 inches.

5. The combination as in claim 1, in which said fuel injection means provides for a spray cone having an included angle effective to spray said fuel onto substantially 60% of the interior surfaces of said capsule.

* * * * *